(12) United States Patent
Fadeyev et al.

(10) Patent No.: US 7,345,975 B2
(45) Date of Patent: Mar. 18, 2008

(54) METROLOGICAL DIGITAL AUDIO RECONSTRUCTION

(75) Inventors: Vitaliy Fadeyev, Berkeley, CA (US); Carl Haber, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 543 days.

(21) Appl. No.: 10/783,231

(22) Filed: Feb. 19, 2004

(65) Prior Publication Data

US 2005/0002319 A1  Jan. 6, 2005

Related U.S. Application Data

(60) Provisional application No. 60/448,752, filed on Feb. 19, 2003.

(51) Int. Cl.
*G11B 7/28* (2006.01)
(52) U.S. Cl. .................... 369/53.41; 369/18; 369/107; 369/84
(58) Field of Classification Search ............... None
See application file for complete search history.

(56) References Cited

U.S. PATENT DOCUMENTS 6,829,207 B1 * 12/2004 Singer .................... 369/53.41

OTHER PUBLICATIONS

Cavaglieri, Stefano S. et al., Optical Retrieval and Storage of Analog Sound Recordings, Oct. 2001, AES 20th International Conference, Budapeth, Hungary, pp. 1-6.*

Poliak, Juraj, The Optical Turntable, http://metwww.epfl.ch/lecteur_disques/MainLectDiscE.htm, published Mar. 3, 2001, accessed on Dec. 12, 2006, 5 pages.*
Mickey Hart, "Preserving Our Musical Heritage," J.Audio Eng. Soc, vol. 49 (No. 7/8), p. 667-670, (Jul. 1, 2001).
Sanju Chiba, "ELP Laser Turntable:How the LT Works," web page: www.elpj.com, p. 1, (Jan. 30, 2004).
Solarius, "3D Confocal Microscopy," web page:www.solarius-inc, p. 2, (Jan. 30, 2004).
Gerd Stanke,Lothar Paul, "3DMeasurement and Modelling in Cultural Applications," Information Services & Use, IOS Press (Berlin, Germany), p. 289-299, (Nov. 10, 1995).
Susanne Ziegler, Gerd Stanke, Michael Bottlinger, Reinhard Kohius, "Experiments with Optical Sanning of Negatives of Edison Cylinders," Museum fur Volkerkunde, p. 155-161, (Nov. 1, 1994).

(Continued)

*Primary Examiner*—Wayne Young
*Assistant Examiner*—Adam R. Giesy
(74) *Attorney, Agent, or Firm*—Lawrence Edelman; Lawrence Berkeley National Laboratory

(57) ABSTRACT

Audio information stored in the undulations of grooves in a medium such as a phonograph record may be reconstructed, with little or no contact, by measuring the groove shape using precision metrology methods coupled with digital image processing and numerical analysis. The effects of damage, wear, and contamination may be compensated, in many cases, through image processing and analysis methods. The speed and data handling capacity of available computing hardware make this approach practical. Two examples used a general purpose optical metrology system to study a 50 year old 78 r.p.m. phonograph record and a commercial confocal scanning probe to study a 1920's celluloid Edison cylinder. Comparisons are presented with stylus playback of the samples and with a digitally remastered version of an original magnetic recording. There is also a more extensive implementation of this approach, with dedicated hardware and software.

27 Claims, 18 Drawing Sheets

OTHER PUBLICATIONS

Stefano S. Cavaglieri, Ottar Johnsen, Frederic Bapst, "Visual Audio:Optical Retrieval and Storage of Analog Sound Recordings," AES 20th International Conference, p. 1-6, (Oct. 5, 2001).

Ottar Johnsen, Frederic Bapst, Christoph Sudan, Sylvain Stotzer, Stefano S. Cavaglieri, Pio Pellizzsari, "VisualAudio: An Optical Technique to Save the Sound of Phonographic Records," Ecole d'Ingenieurs de Fribourg-Fonteca Nazionale Svizzera, p. 1-8, (Nov. 10, 2001).

Ofer Springer, "Digital Needle-A Virtual Gramaphone," web page:www.cs.huji.il, p. 6, (May 9, 2002).

* cited by examiner

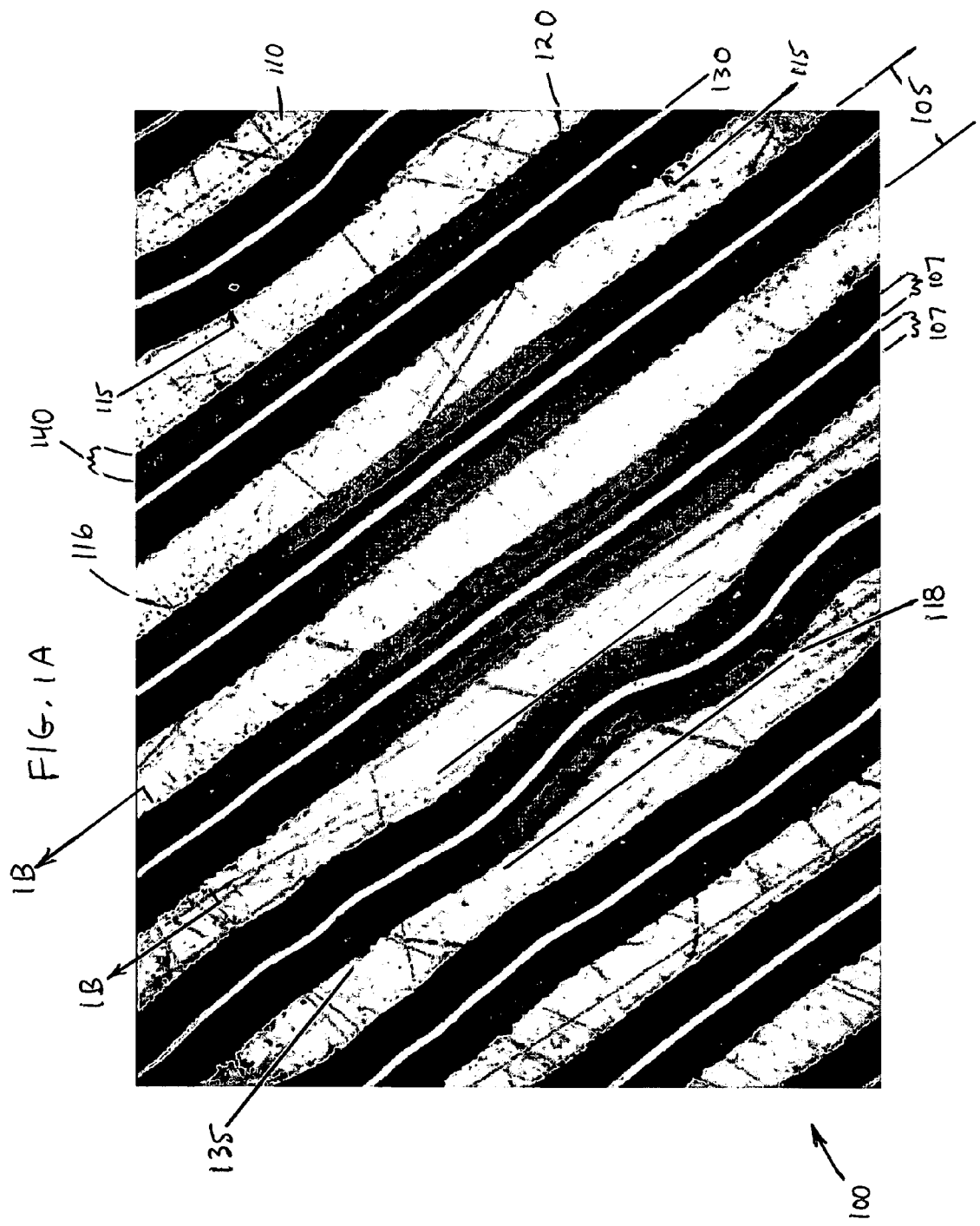

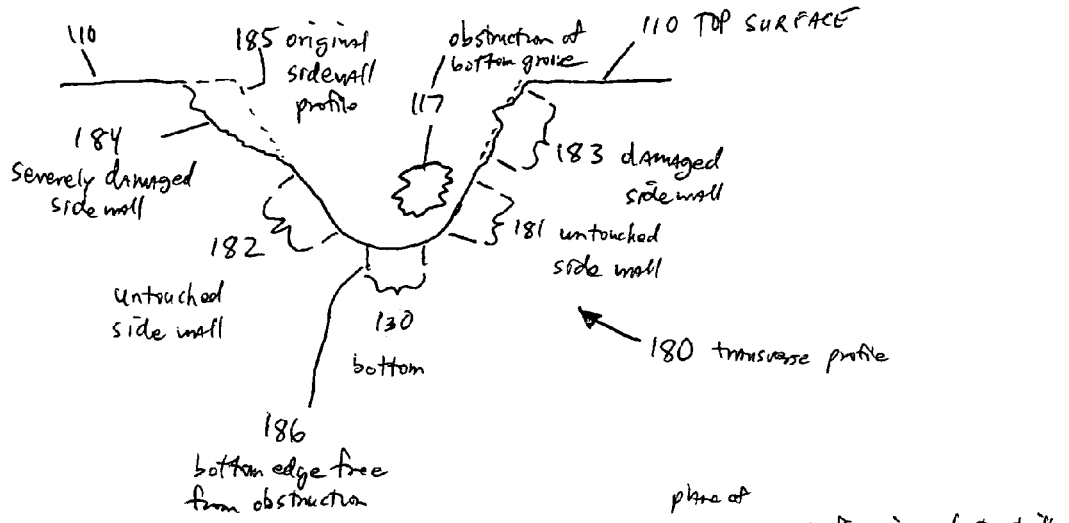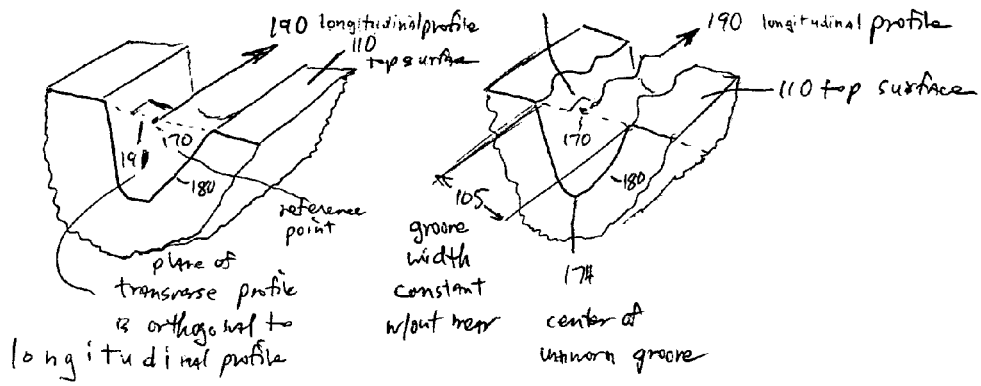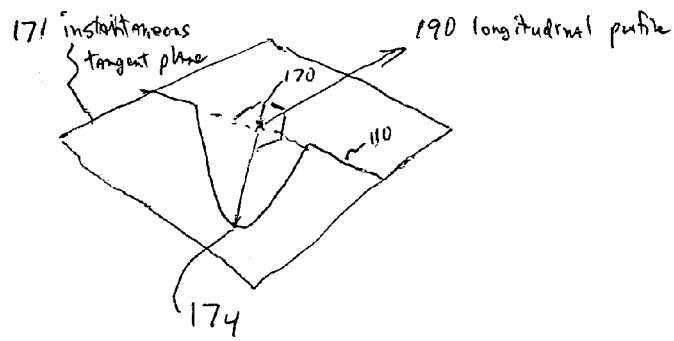

Sectional view of a stylus in a groove. The dimensions for coarse groove, fine groove, and ultra fine groove are as follows:

| Dimension | Coarse | Fine | Ultra Fine |
|---|---|---|---|
| A | ·006 | ·0027 | ·0010 |
| B | ·0008 | ·0004 | ·0004 |
| C | ·0019 | ·0007 | ·00017 |
| D | ·0027 | ·001 | ·00025 |
| E | ·0023 | ·00027 | ·00015 |
| F | 45° | 45° | 45° |
| G | 90° | 90° | 90° |

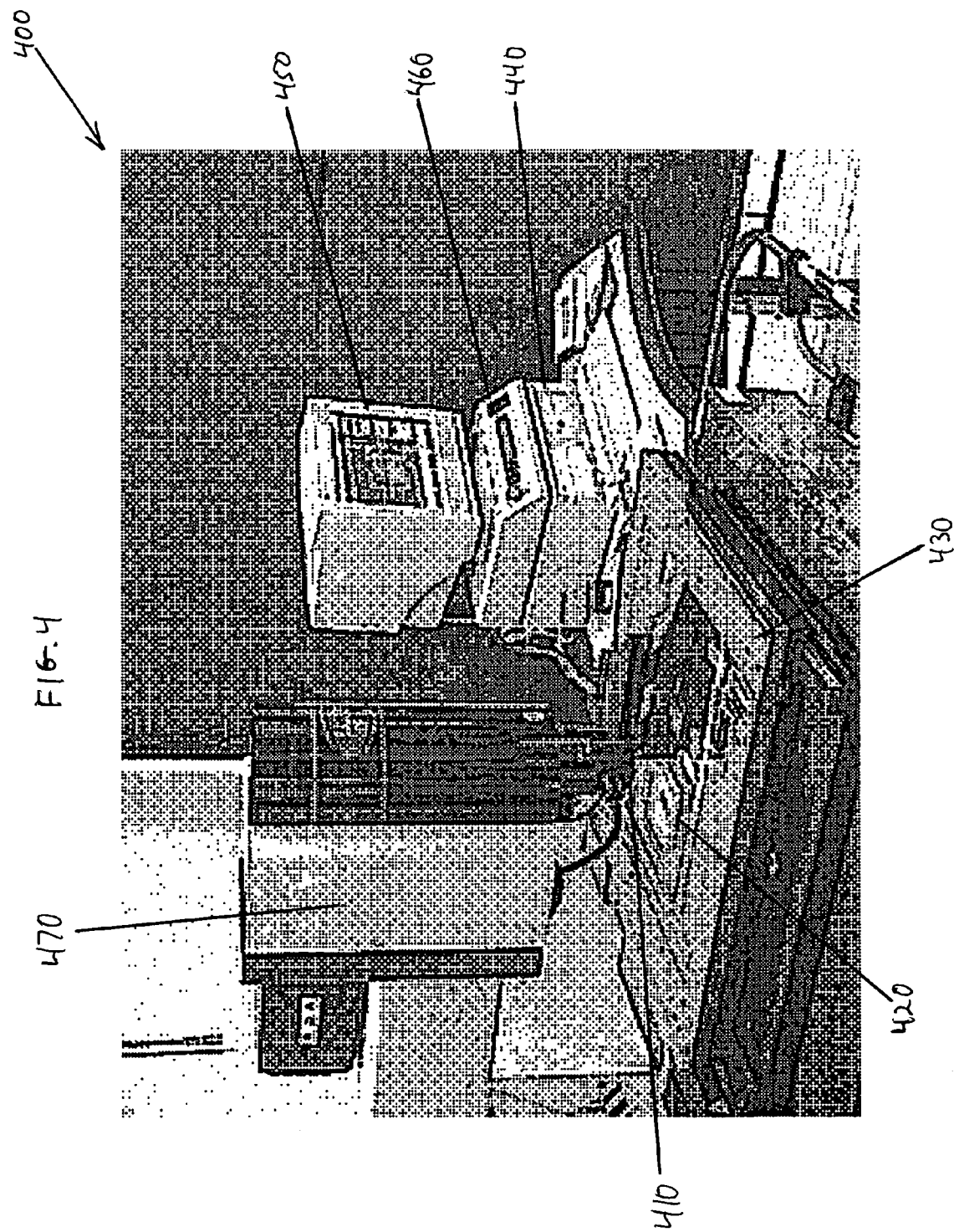

FIG. 5A, B, C
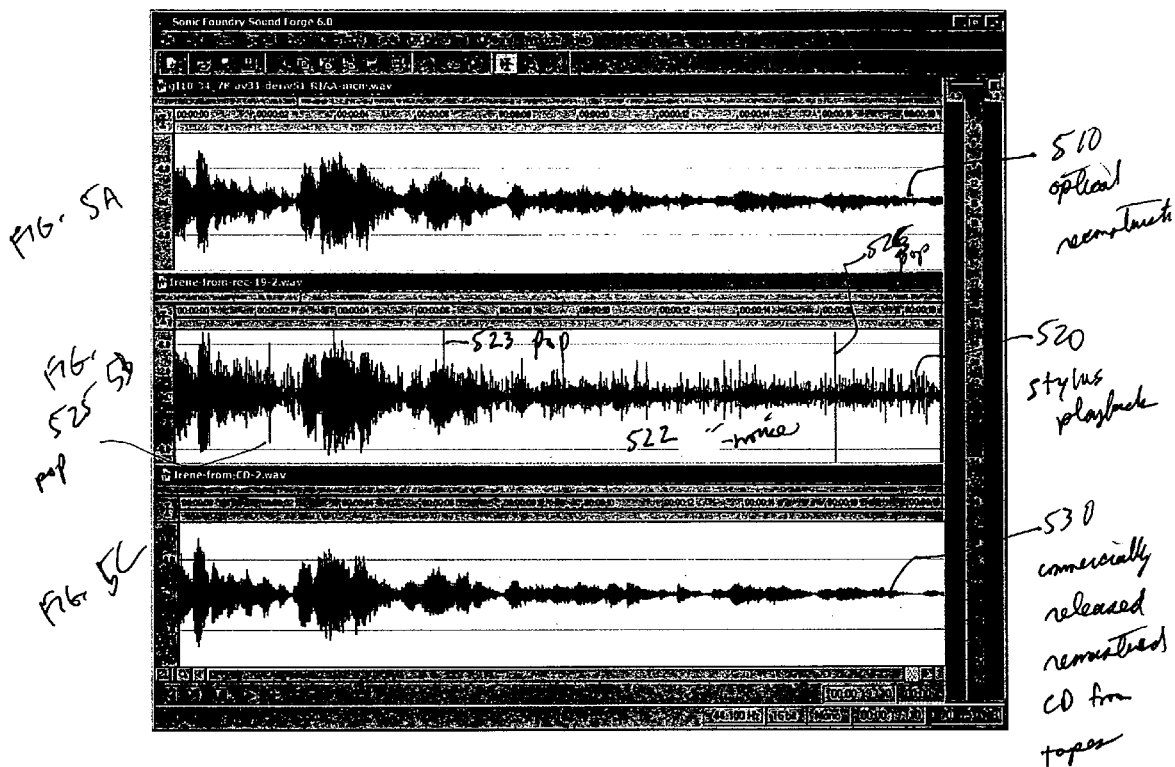

FIG. 6A, B, C
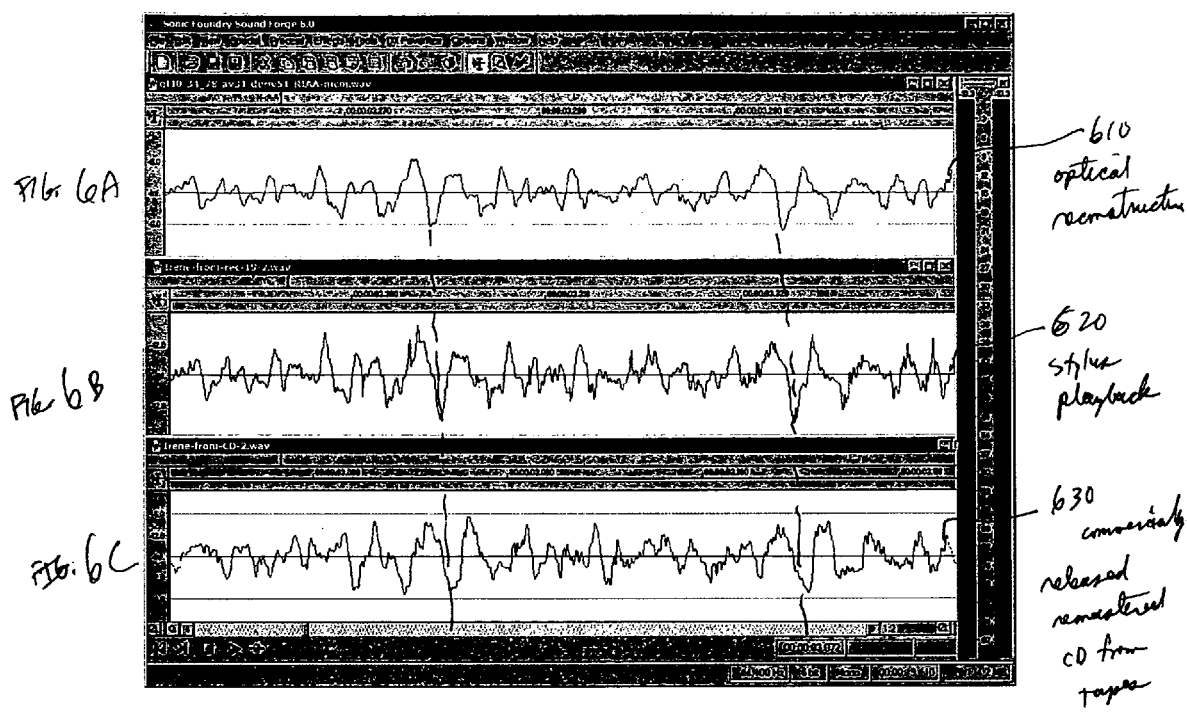
FIG. 6D
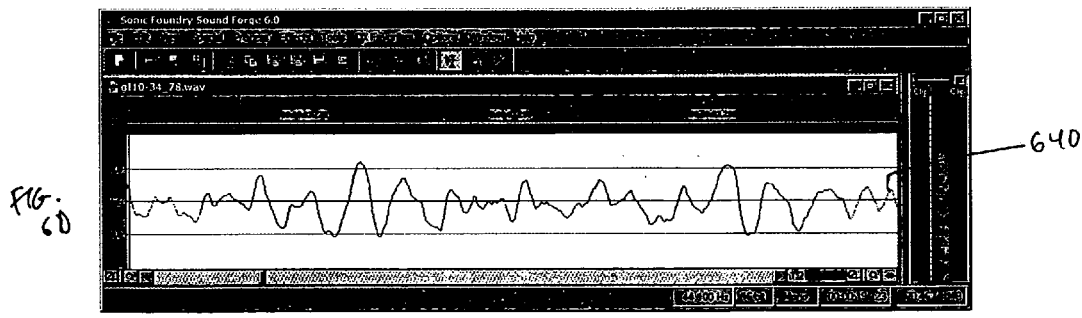

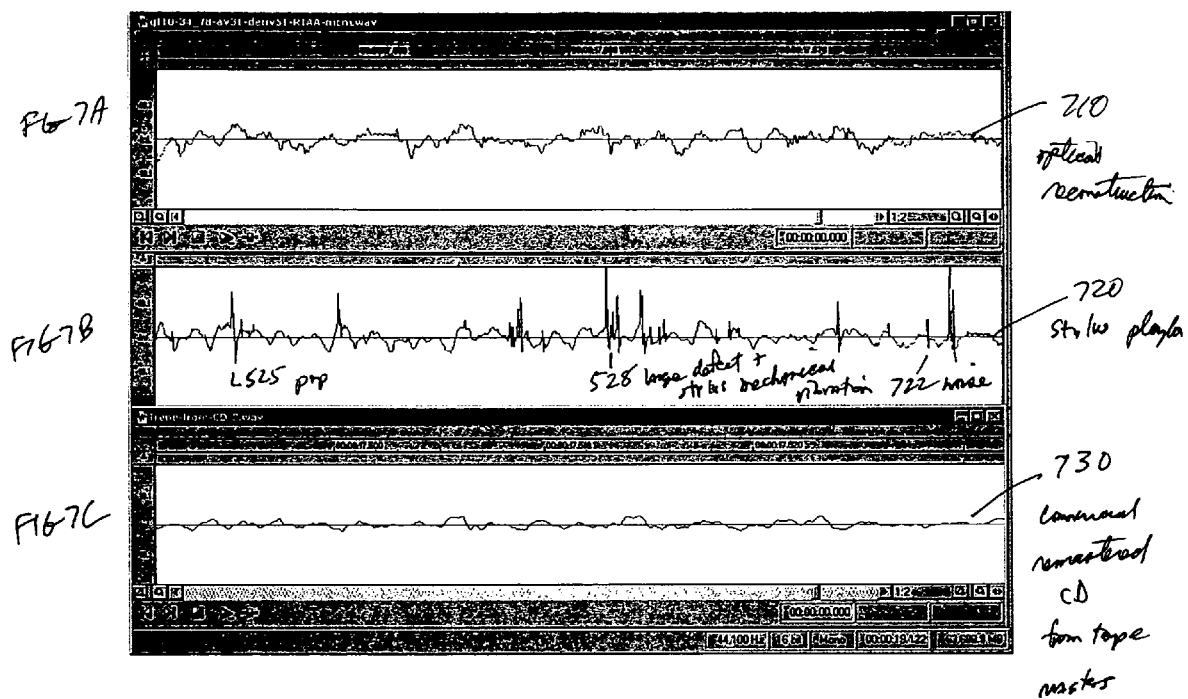
FIG. 7A, B, C

FIG. 8A optical dip FFT
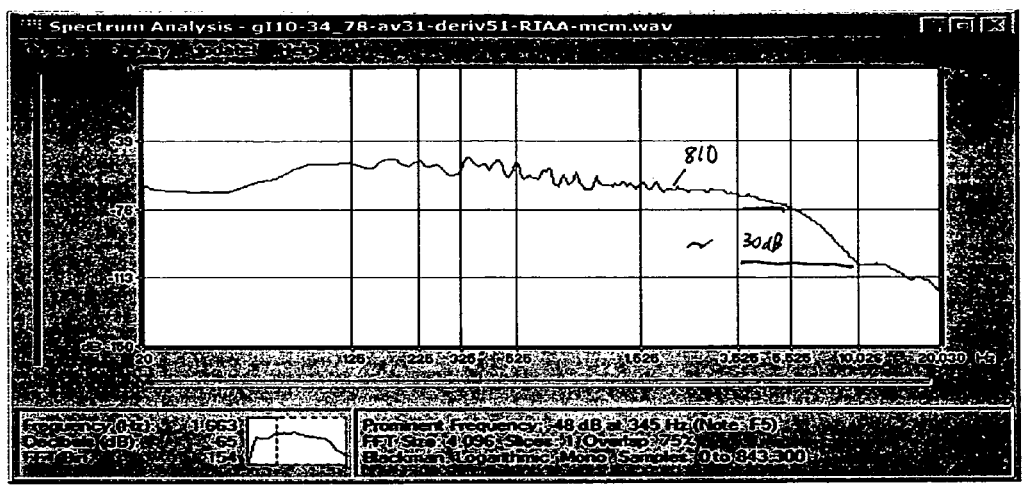
FIG. 8B stylus playback    (pronounced HF noise above 5KHz
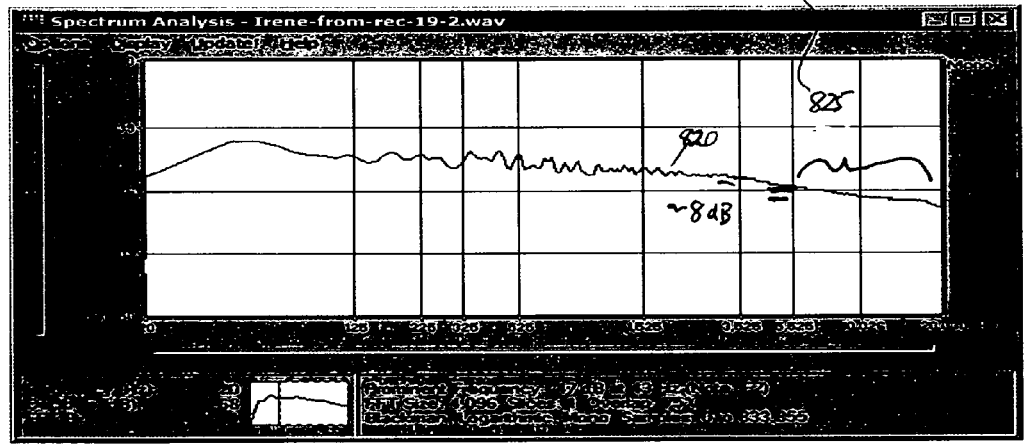

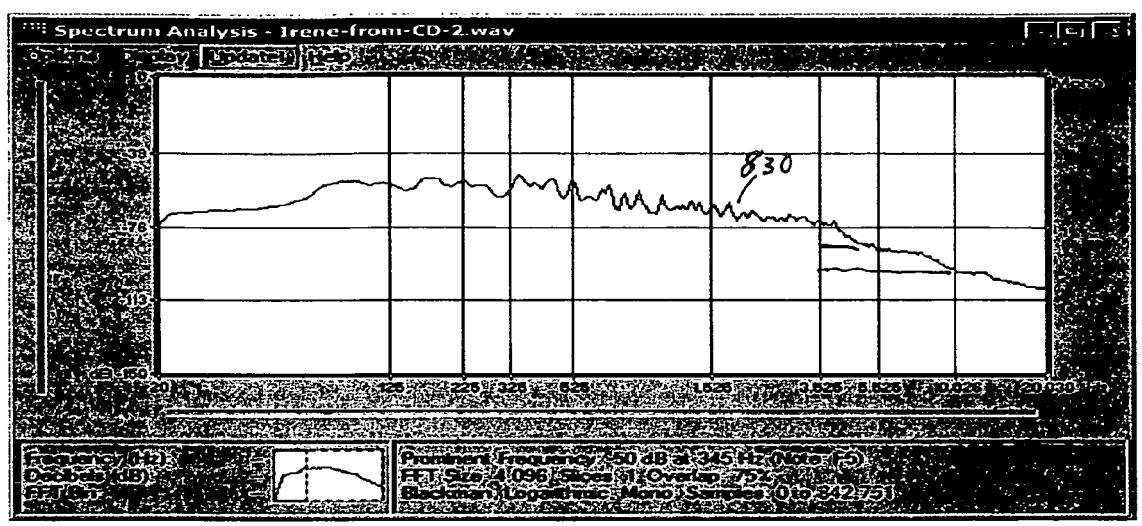
FIG. 8C CD remaster

FIG. 9A,B

FIG. 10A,B
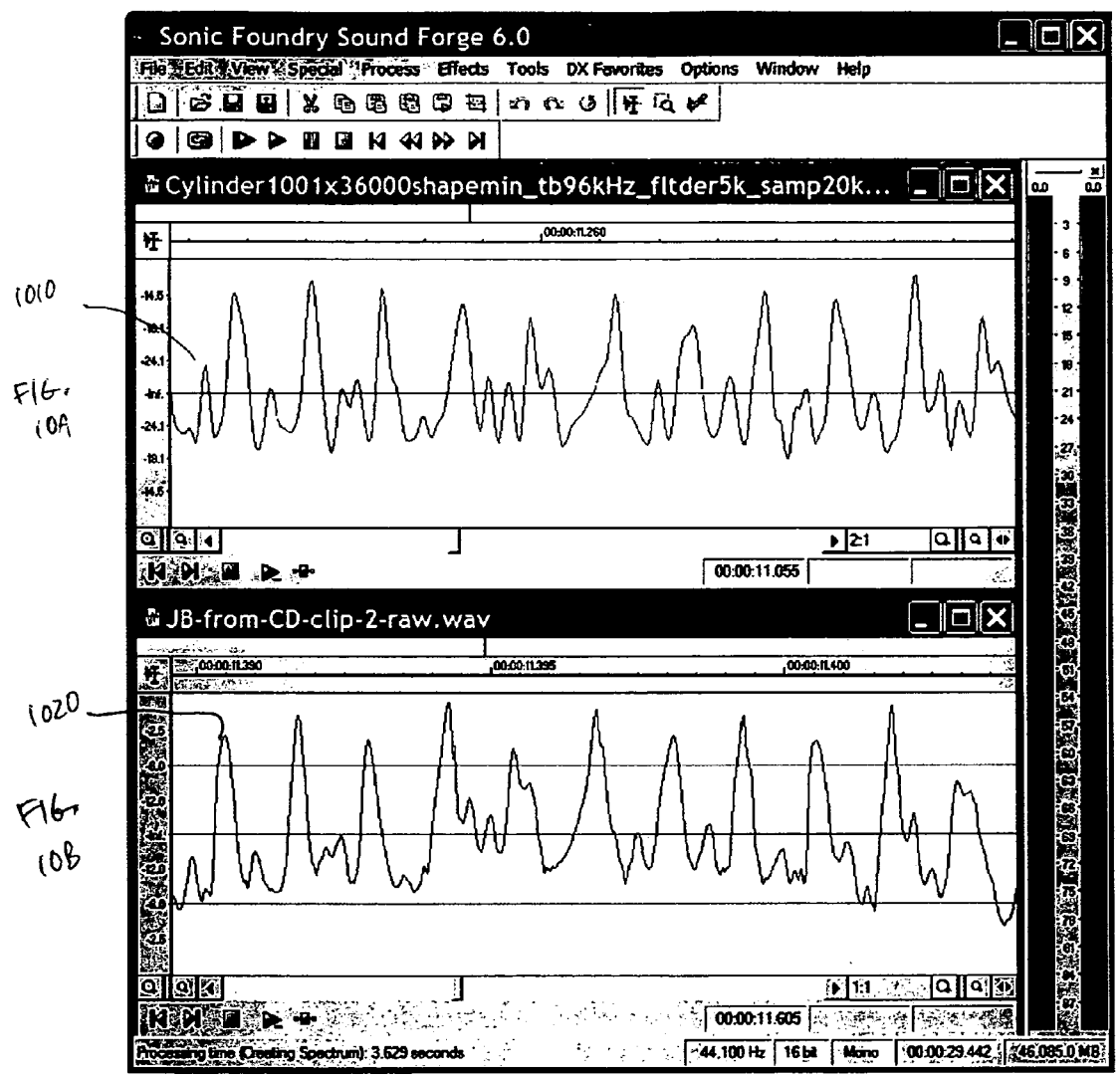

FIG. 11A,B

FIG. 13 A,B,C
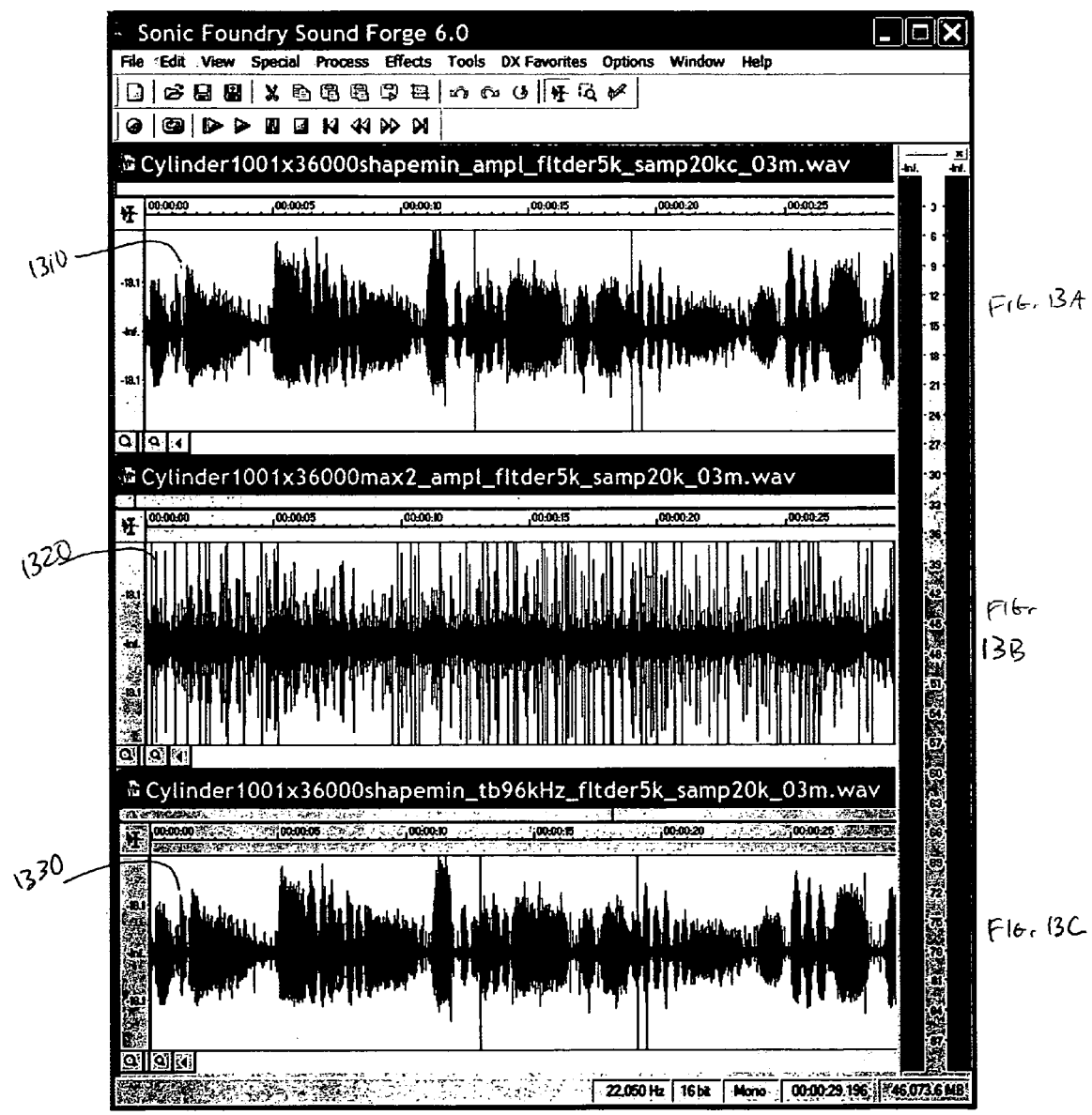

METROLOGICAL DIGITAL AUDIO RECONSTRUCTION

CROSS-REFERENCE TO RELATED APPLICATIONS

This application claims priority from U.S. Provisional patent application No. 60/448,752 entitled "Reconstruction of Mechanically Recorded Sound by Image Processing" filed Feb. 19, 2003, which is herein incorporated by reference in its entirety.

STATEMENT OF GOVERNMENTAL SUPPORT

This invention was made during work supported by U.S. Department of Energy under Contract No. DE-AC03-76SF00098. The government has certain rights in this invention.

REFERENCE TO SEQUENCE LISTING, TABLE, OR COMPUTER PROGRAM APPENDIX

Attached hereto and incorporated by reference is a compact disc recording of five short sound tracks.

Track 1 is an optically reconstructed version of a 78 r.p.m. shellac disc corresponding to FIG. 5A, with duration of approximately 19 seconds.

Track 2 is a mechanical stylus playback version of same physical disc of Track 1, and corresponds to FIG. 5B.

Track 3 is a version from commercial compact disc reissue of the original source material of FIGS. 5A and B, based upon original studio magnetic tape masters, and corresponds to FIG. 5C.

Track 4 is an optically reconstructed version of a 160 r.p.m. celluloid cylinder entitled "Edison Blue Amberol", with duration of approximately 24 seconds, and corresponds to FIG. 9A.

Track 5 is a mechanical stylus playback version of same source material (using a different physical cylinder) of Track 4, and corresponds to FIG. 9B.

BACKGROUND OF THE INVENTION

1. Field of the Invention

The present invention relates to recorded analog signals, and particularly relates to recorded analog signals spatially distributed in a modulated groove.

2. Related Art

Cavaglieri, S., Johnsen, O., and Bapst, F., in the Proceedings of AES 20$^{th}$ International Conference, Budapest, Hungary 2001, Oct. 5-7, presented a method of audio reconstruction wherein full size photographic contact prints are made of disc record surfaces. These films then serve as an archival medium, which are then scanned with a digital camera to retrieve the audio data. This retrieval method includes the extra step of traditional silver chemistry film photography, which may also add noise and degrade resolution. This method is a de facto two-dimensional approach due to the data originating from a single two-dimensional film image, with no three-dimensional analog. This archival method is only suited to lateral groove disc media and cannot accommodate cylinders or other vertically modulated media. Furthermore, this system maps the three-dimensional features of recorded grooves to a two-dimensional medium, thereby discarding the full three-dimensional information available in the original groove.

Stanke, G. and Paul, L., "3D Measurement and modeling in cultural applications", Inform. Serv. & Use 15 (1995) 289-301, propose using a two-dimensional digital image capture as a method to measure the vertical groove modulation on the interior surfaces of cylinder molds ("Galvanos"). Stanke and Paul propose to use grey-scale intensity variations of the image as a quasi-measurement of height. This approach has only poor resolution due to the weak proportional relationship between actual surface height and grey-scale response.

Springer hosts a web site http://www.cs.huji.ac.il/~springer/, which presents results from scanning of the surface of a disc recording by using a commercial desk-top scanner which thereby captures a digital image of the medium. Using this digital image the author attempts to reconstruct the audio data. However, the desk-top scanners have insufficient resolution to capture the subtle deflections of groove modulation in the media, and are also limited by a faulty assumed proportionality of grey-scale versus surface feature height. The direct scanning method is de facto two-dimensional, and thus also has no true three-dimensional analog. It cannot accommodate three dimensional media such as cylinder.

BRIEF SUMMARY OF THE INVENTION

One aspect of the present invention provides a method of audio extraction of a mechanical recording, comprising: providing a mechanical recording comprising a modulated groove in a surface; (1) said surface having a tangent plane at each point in said modulated groove; (2) said groove comprising: (a) a substantially constant short transverse profile portion comprising two sides and a bottom surface; (b) a long longitudinal profile substantially orthogonal to said short transverse profile; ii) profiling said mechanical recording to form a metrological data set comprising metrological data; and iii) processing said metrological data set into an audio extraction.

The profiling step may be accomplished by confocally imaging the modulated groove. Such confocal imaging may in turn be either mono- or poly- chromatic. Additionally, laser interferometry, white light interferometry, digital sectioning, or stylus profilometry may be used where the measurement resolution is less than 10 microns, preferably less than 2 microns, more preferably less than 1 micron, and most preferably less than about 0.5 microns.

The modulated groove is typically best described by having: a short transverse profile; and a long longitudinal profile substantially orthogonal to said short transverse profile. Although the methods described will work for any geometry having a groove, in most recordings of audio historical interest, the groove typically winds about the surface of the recording medium in the pattern of a spiral on a disc, or as a solenoidal winding about a cylindrical shape. Typically, there is only one groove on each side of these surfaces.

The transverse profile described above has a path modulation of the short transverse profile which is substantially orthogonal to the long longitudinal profile. Such transverse profile is the result of the cutting action of a mechanical stylus oscillating in the transverse direction while being drawn along in the longitudinal direction. Frequently, the mechanical stylus is of a historically known geometric cross-section, which may be beneficially fitted during processing to best detect the path such stylus would have taken as it transversely oscillated along its longitudinal path.

The path modulation is typically related to audio recordings during the early portion of the twentieth century. Such recordings are intended to be played on a phonograph; however, due to chemical, physical and/or temporal degradation of such recordings, traditional playing of such recordings by a mechanical contacting stylus would, in many cases, irretrievably damage the recording. One should note that stylus profilometry uses significantly less force, and is dimensionally much smaller than the initial cutting stylus, and therefore may not irretrievably damage the recorded mechanical groove.

The groove path modulation is typically parallel to the tangent plane of the surface for disc-based recordings. For the cylindrical type Edison recording, the groove path modulation is typically out of the tangent plane of said surface, or in the hill-and-dale configuration. For traditional 33⅓ r.p.m. stereo recording, the mono component is typically parallel to the tangent plane of the surface, with the stereo component modulated out of the plane of the surface. Regardless of medium geometry, profilometric methods may be used to obtain the modulation for a recorded groove.

For analytical purposes, as well as numerical reconstruction purposes, an instantaneous tangent plane may be formed that is tangent to the bulk surface (the original surface without any mechanical groove) that is orthogonal to a transverse profile of the mechanical groove. Such tangent plane may wobble somewhat with warping of traditional disc recordings, or completely revolve, as around a cylindrical recording.

For the purposes of this invention, a positive recording has indented grooves that allow direct playback by a mechanical stylus or needle. Alternatively, a negative recording, frequently referred to as a master or stamper, have mirrored grooves that are incapable of direct playback with the same mechanical stylus or needle. In order to play from a master or stamper, the master or stamper is pressed or molded into a typically softened material, so that the groove on the master is pressed into or stamped into the positive recording medium. It is the positive recording medium that is then mass-produced.

The surfaces of suitable recording media include, but are not limited to: members of the acetate family, glass, wax, paraffin, lacquer, shellac, varnish, vinyl, celluloids, metallic soaps, aluminum, copper, zinc, a metal, a metal alloy, and a thermoplastic. These surfaces have in common an ability to have a mechanical groove emplaced thereupon, typically, but not necessarily by a stylus or a stamping process. Thermoset plastics, such as bakelite, may also have been cast or originally etched with a stylus to form mechanical grooves for audio recording.

The profiling step may further comprise joining a plurality of profiles to form said metrological data set. Alternatively, a section of adjacent mechanical grooves may be profilometrically sampled simultaneously, with the transverse profiles extracted therefrom. Such sections may be joined, or stitched together, to form contiguous mechanical grooves. Ultimately, such process may be used to form a metrological data set describing the single groove on traditional disc-format and/or cylinder recordings.

Once the metrological data has been obtained, numerical analysis methods such as linear interpolation using orthogonal polynomial bases may be used in piecewise approximating said metrological data set to model said modulated groove. The simplest of such widely known methods would be linear interpolation of a straight side wall section of the transverse profile using root mean square error minimization techniques.

The piecewise approximating step may be used in tracking a spatial location of the substantially constant profile portion in the mechanical groove to provide a tracked spatial location. A spatial location may be determined by the metrological data representing one side of said groove. Alternatively, the tracking step spatial location may be determined by the metrological data representing both sides of said groove.

The tracking step spatial location may be determined by the metrological data representing the substantially constant profile portion of the mechanical groove. The tracked spatial location represents the motion of the original cutting stylus in the transverse plane, and is a constant offset vector in the instantaneous transverse plane from the transverse geometric areal centroid of the original cutting stylus.

Either simultaneously with the obtaining, or after the metrological data has been obtained, it may be processed by transforming said tracked spatial location into an audio extraction. Such audio reconstruction, which may be a digital data file or an analog data file, may then be stored respectively on a computer readable medium or an audio medium.

The tracking step may further comprise: interpolating the spatial location in the transverse profile portion to provide the tracked spatial location. This manner of interpolation allows for degradation and debris in a particular transverse profile. Where, for instance, some of a side wall of the instant transverse profile is damaged, cut, or obstructed from profilometry, the other side wall, the bottom profile, or both may be used to form a spatial location.

The spatial location that is tracked represents the original path a stylus would have taken in the original recording, or alternatively, the mastering, of a recording. The spatial location may be transversely offset to represent either the transverse centroid of the groove, a defined depth position on one straight side wall, or the bottom of the recorded mechanical groove. Such offset will not affect audio extraction so long as it is a constant offset.

In portions of a recording where the entire transverse profile is lost, due to debris, deep scratches, medium exudation, or other cause, another method of longitudinal interpolation may be used. Longitudinal interpolation uses the interpolations of longitudinal spatial locations before and/or after a defect in the medium. A simple example would be a linear interpolation from transverse profiles having good data on either side of a defective transverse profile. If using only spatial locations before a defect in the medium, such interpolation is alternatively known as extrapolation, which has many well-known numerical methods applicable.

As with transverse interpolation, one may practice longitudinal curve fitting of the tracked spatial location for minimized error from the short transverse profile portion, and then transforming the tracked spatial location into the audio extraction. Such longitudinal curve fitting may be tailored to correct for media defects such as wow, flutter, offset spiral of Archimedes due to a mispositioned central hole relative to the groove center of rotation, tracking error, acylindrical deformations, or other effects.

The resultant audio reconstruction may comprise the audio extraction above stored on a computer readable medium or an audio medium.

For segments of the mechanical groove where detecting an accurate spatial location of the transverse profile is impossible, one may interpolate the spatial location in the longitudinal profile portion to provide the tracked spatial location. As with transverse interpolation, many different standard methods of numerical interpolation may be used.

These methods have in common that the curve fitting of the tracked spatial location is done for minimized error by using tracked spatial location data from adjacent short transverse profile portions on either or both sides of the damaged mechanical groove. Once such longitudinal interpolation is completed, the tracked spatial location data may be transformed into the audio extraction. Subsequently, or contemporaneously, an audio reconstruction may be made by storing the audio extraction on a computer readable medium or an audio medium. These methods may ultimately be used for real-time playback/archival storage of such source media, but would require further refinements in hardware and/or software to achieve such speed.

Both the transverse and longitudinal interpolation methods have the practical application of reducing noise in the audio reconstruction.

Recapping, the overall method for reconstructing a mechanical recording comprises: a) providing a mechanical recording comprising analog audio data; b) a means for extracting metrological data from said analog audio data; and c) a means for transforming said metrological data into an audio extraction of said mechanical recording.

BRIEF DESCRIPTION OF THE DRAWINGS

FIG. 1 is a photomicrograph of grooves on a 78 r.p.m. recording, having coaxial illumination, with an image size of approximately 1390×1070 microns.

FIG. 4 is a photograph of an Optical Gauging Products Avant Zip 400 Smart Scope metrology system.

FIGS. 5A, B, and C are a sound clip of 19.1 seconds from: A) optical reconstruction (top trace), B) stylus playback (middle trace), and C) new commercial CD release studio version (bottom trace).

FIGS. 6A, B, and C respectively correspond to expanded sections of FIGS. 5A, B, and C beginning at 3.261 seconds from the start of the optical sound clip and lasting 40 ms, where the traces at: FIG. 6A is optical, FIG. 6B from stylus, and FIG. 6C from CD.

FIG. 6D shows the actual waveform of the groove amplitude versus time before numerical differentiation. The segment corresponds to that of FIG. 6A.

FIGS. 7A, B, and C reflect a quite portion of the sound clip, beginning at 17.661 seconds from the start of the optical data, showing a relative absence of the sharp noise transients in FIG. 7A (top) from the optical audio reconstruction and FIG. 7C (bottom) from the CD version, but is readily apparent in FIG. 7B (middle) the stylus version.

FIG. 8A is a fast Fourier transform (FFT) spectrum of the optical sound clip.

FIG. 8B is a FFT spectrum of the stylus played back sound clip.

FIG. 8C is a FFT spectrum of the CD version sound clip.

FIG. 9C is the numerical derivative at each point corresponding to FIG. 9B by minimization of the $\chi^2$ error using a $4^{th}$ order basis polynomial fit to a set of 15 points centered on that point, with the resulting fitted polynomial differentiated analytically and plotted as a point corresponding to the same angular coordinate as displayed in FIG. 9B.

FIGS. 10A and B are corresponding expanded sections of FIGS. 9A and 9B beginning at 11.254 seconds from the start of the optical sound clip, and lasting 14 milliseconds, where the traces FIG. 10A is optical and FIG. 10B is from a stylus.

FIGS. 13A, B, and C are from the analysis of the optical reconstruction of the celluloid cylinder recording. FIG. 13A is based upon a measurement of the groove bottoms only, FIG. 13B is based upon a measurement of the ridges between grooves only, and FIG. 13C is based upon the difference between groove bottoms and (averaged) ridges, as described below.

DETAILED DESCRIPTION OF THE PREFERRED EMBODIMENT

1. Definitions

Figure 2A:
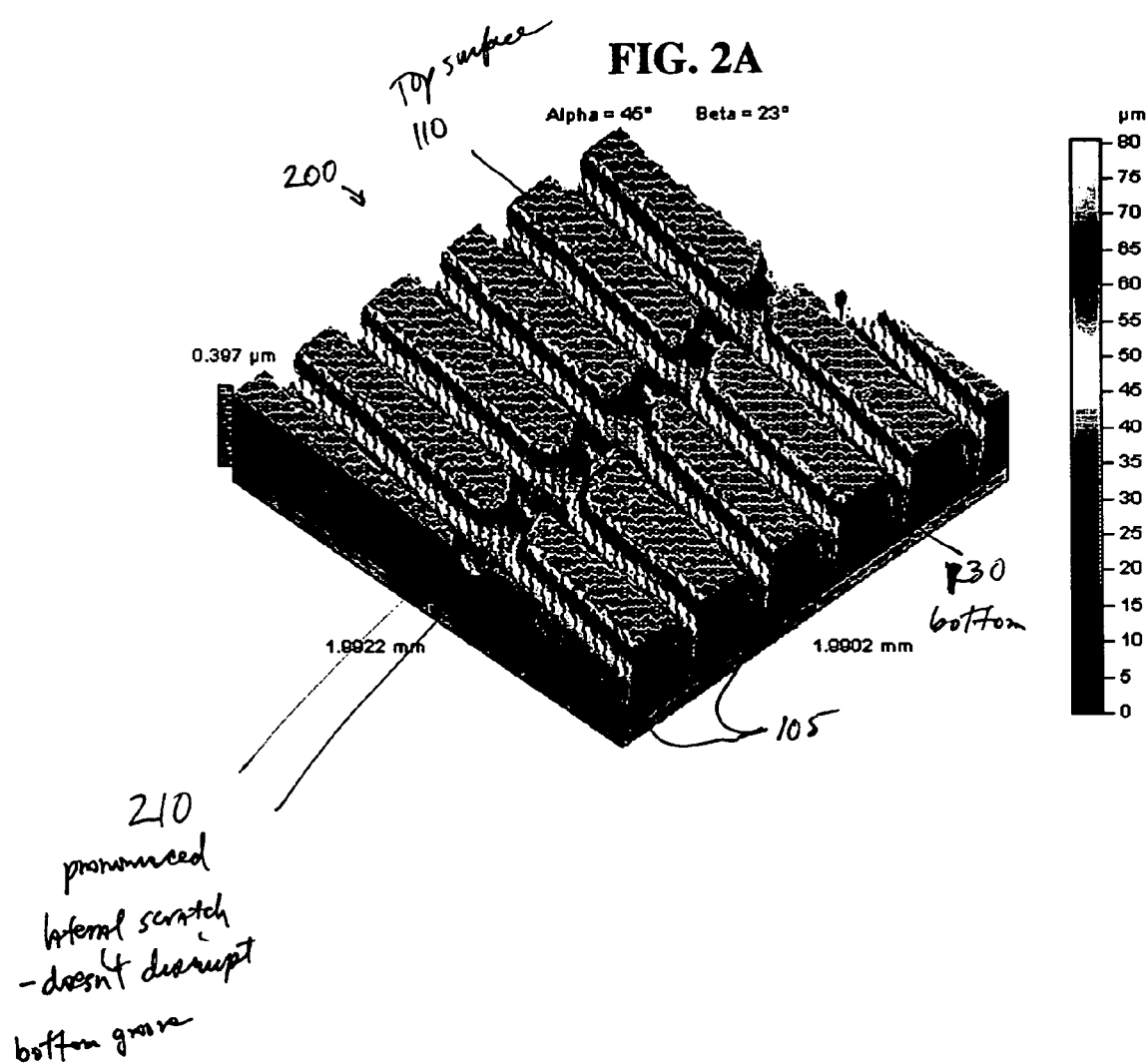
FIG. 2A is image data of scratched groove field on a 78 r.p.m. recording acquired using a commercially available laser confocal scanning probe, scanning a field of 1.99×1.99 millimeters.

"Profile" means a variation of the elevation of a feature versus position.

"Transverse profile" means the cross-section of a mechanical groove taken in the shorted direction, orthogonal to the instantaneous average longitudinal path of the mechanical groove.

"Longitudinal profile" means the elevation of the path of a mechanical groove as it follows the surface of a medium.

The mean longitudinal profile path at every point is orthogonal to a corresponding transverse profile.

"Mechanical groove" means any spatially modulated feature covering a portion of a surface, and typically having at least a portion of a transverse profile approaching a constant profile.

"Tangent" means a line coplanar with a tangent plane constructed so as to pass through a point on the surface of a medium defined by a mathematical function.

"Surface" means a bulk surface of a medium defined by a mathematical function averaged over a spatial distance of a plurality of mechanical grooves.

"Positive medium" means any medium having a mechanical groove indented below the surface that may be directly played by a stylus or needle.

"Negative medium" means any medium having a mechanical groove protruding above the surface that must first be placed in contact with a positive medium so as to transfer the mechanical groove, so that the positive medium may then be directly played by a stylus or needle.

"Computer" means any device capable of performing the steps, methods, or producing signals as described herein, including but not limited to: a microprocessor, a microcontroller, a digital state machine, a field programmable gate array (FPGA), a digital signal processor, a collocated integrated memory system with microprocessor and analog or digital output device, a distributed memory system with microprocessor and analog or digital output device connected by digital or analog signal protocols.

"Computer readable media" means any source of organized information that may be processed by a computer to perform the steps described herein to result in, store, perform logical operations upon, or transmit, an audio extraction, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FPGAs), flash random access memory (flash RAM); and information transmitted by electromagnetic or optical methods including, but not limited to, wireless transmission, copper wires, and optical fibers.

"Confocal Imaging" means any process whereby the height variations of a sample are determined by focusing a single or a group of points on to the sample. The reflected light spot is imaged back onto a detector which senses whether the light spot is in or out of focus and the extent of focus is used to track the height of the sample. Such a light spot or spots may be scanned in directions perpendicular to the height variations or in a plane tangent to the height variations by motion of the sample or the light source and/or detector to create a three dimensional map of the sample.

"Monochromatic Confocal Imaging" means confocal imaging when the light source is of a single wavelength such as a laser.

"Polychromatic Confocal Imaging" means confocal imaging when the light source consists of multiple wavelengths and the optical chain may have chromatic aberration and the detector may be wavelength sensitive.

"White Light Interferometry" means any process which uses a light source consisting of multiple wavelengths and the interference of light waves to determine the height variations of a sample.

"Digital Sectioning" means any process which determines the height variation of a sample by acquiring multiple two dimensional images in a planes or tangent planes perpendicular to the height variations of the sample, each with depth of field less than or equal to the spacing of the images planes, and reconstructs the three dimensional sample profile by combining these images.

"Stylus Profilometry" means any process which determines the height variation of a sample by scanning a stylus across the sample surface in a plane or tangent plane perpendicular to the height variations and measuring the displacement of the stylus.

2. Introduction

The preservation of mechanically recorded sound is an issue of considerable current interest. Extensive recorded sound collections and archives exist world-wide. Many older mechanical recordings are damaged or are considered at risk for deterioration with time or due to further contact with a playback stylus. Some valuable recordings, such as irreplaceable presidential addresses, were only made as "instantaneous," or rather, contemporaneous "live" transcriptions on cellulose acetate or cellulose nitrate, which are particularly delicate. A method of extracting sound from these samples, which would do no further damage, is therefore attractive. Furthermore, playback with a stylus only samples the portion of the groove wall in contact. Better quality information may still reside in other parts of the groove cross section undamaged by stylus wear. A method of extracting information from any region of the groove is attractive as well.

With media in a variety of formats and in a range of conditions, archivists seek a method of transcription and digitization that requires minimal operator intervention to facilitate efficient mass digitization of their collections for the purposes of preservation and access.

The present invention applies techniques of precision metrology, digital image processing, and numerical analysis to the problem of extracting audio data from recordings based on mechanically recorded grooves. A number of sequential digital images of a groove pattern may be acquired using a surface profiling system, electronic camera, or other imaging system. Such images may be acquired using medium to high magnification. These images may then be digitally processed to extract the audio data recorded thereon. Such an approach offers a way to provide non- or minimal-contact reconstruction, and may in principle sample any region of the groove.

An example of one such image acquired with an electronic camera is shown in FIG. 1A. It depicts a magnified groove field 100 viewed with coaxially incident light. This sample was taken from a 78 r.p.m. recording. The thin bright lines are the groove bottoms 130, which will reflect such coaxially incident lighting. The groove 105 has a width at the record surface 110 of the record of about 160 microns. A 10 KHz tone would have a wavelength on the grooves 105 between 40 and 100 microns at the minimum and maximum radii on the record respectively. These base wavelengths are different lengths due to the typically constant angular rotational rates at different radii, which result in different linear velocities.

Referring now to FIG. 1A, we see dark sections of the groove 105 that represent unworn sides of the groove 107. A plethora of defects become apparent with a pronounced scratch 116, light scratches 120, stylus wear on the upper side of the groove 140, dust or exudation 115 in several locations, obstructions 117 on the bottom of the groove 105 that interfere with viewing of the groove bottom 130, and yet more damage of the upper edge of the groove 135.

Now refer to FIG. 1B, which is a modified transverse profile 180 cross-section of a mechanical groove of FIG. 1A. Here we see the groove bottom 130, a right untouched sidewall 181, and a left untouched sidewall 182. On the right side, we see damaged sidewall 183 continuing up to the top surface 110 of the medium. On the left side, we see a severely damaged sidewall 184, which has substantial material removed from the original sidewall profile 185 (shown in dashes). A typical obstruction of the bottom groove 117 would occlude viewing of the bottom groove 130 right side, while still allowing viewing of the bottom groove 130 left side.

Now refer to FIG. 1C, which depicts the relationship between the longitudinal profile 190 as it moves along the top surface 110. Here we see that the transverse profile 180, without defects, is orthogonal to the longitudinal profile by the right angle formed thereby 191. A reference point 170, such as the center of the transverse profile 180 tangent to the surface 110 is used in this example as the point the longitudinal profile 190 follows about the top surface 110. For simplicity, in FIG. 1C, the transverse profile 180 is shown without modulation.

FIG. 1D adds modulation to the geometry of FIG. 1C, and now shows that the longitudinal profile 190 is modulating so as to follow the center of the unworn groove 174 half way between the groove 105 width at the top surface 110 of the medium.

FIG. 1E shows the orthogonality conditions for analyzing the mechanical groove geometry. Here, an instantaneous tangent plane 171 is formed at the mean top surface 110. This makes the longitudinal profile 190 coplanar with the tangent plane 171 for recordings having only a transverse modulation of the groove. Thus reference point 170 forms a line with the center of the unworn groove 174, which is perpendicular with the longitudinal profile 190. Additionally, the transverse profile 180 is perpendicular to the average longitudinal profile 190 as shown before.

FIG. 2A shows a profilometry example image 200. This image was captured with a commercially available confocal scanning probe and shows a set of grooves 105 in a 78 r.p.m. shellac disc with a pronounced lateral scratch 210. The field of view is 1.99 millimeters×1.99 millimeters. It is clear that although the pronounced lateral scratch 210 would otherwise have a severe impact on stylus playback due to disruption of the top surface 110, the mechanical groove 105 bottom 130 remains unscathed. In this case, the scratch would not affect metrological reconstruction.

Figure 2B:
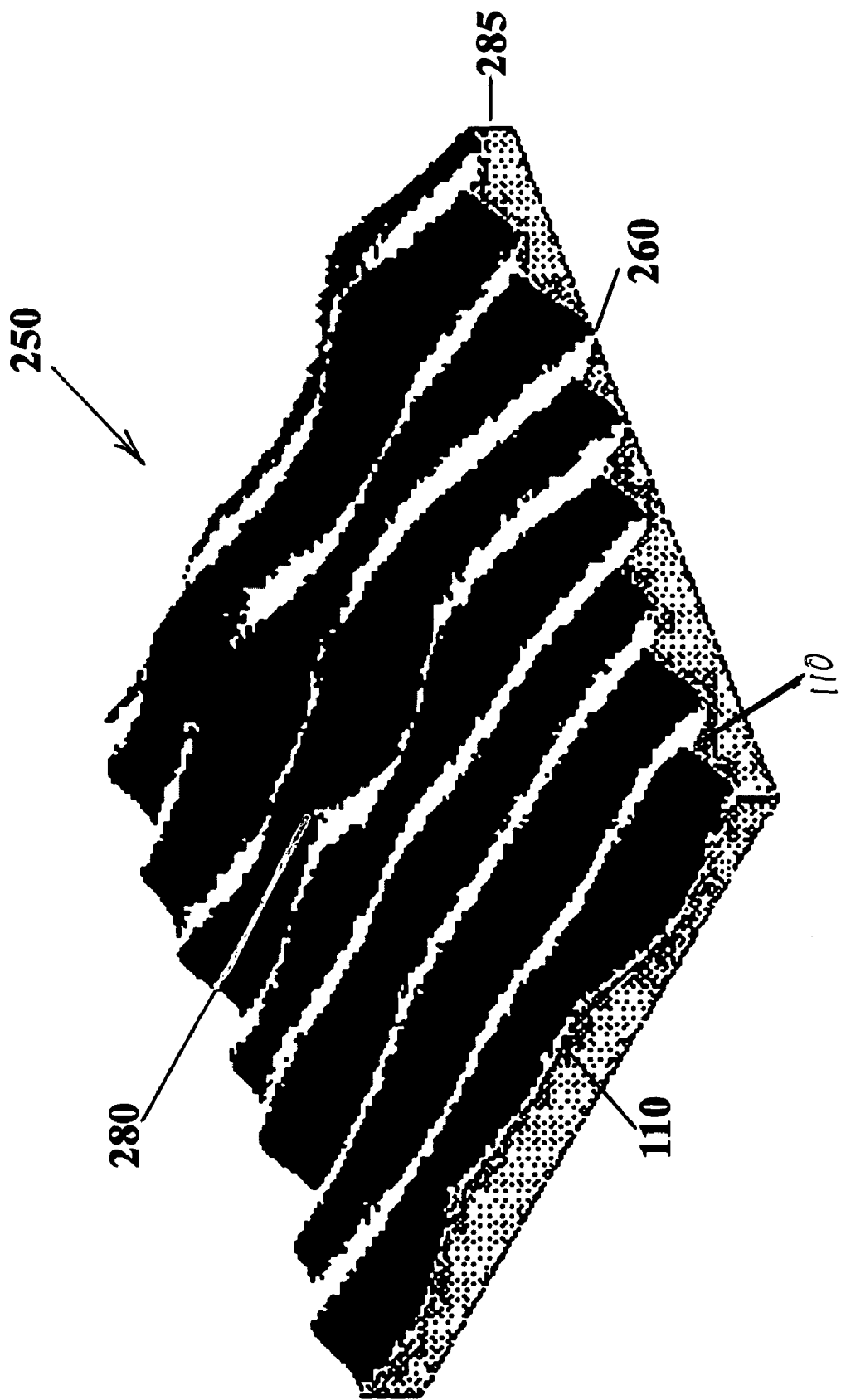
FIG. 2B is an image of a region of the surface of an Edison Blue Amberol cylinder over a field size of 1×0.91 mm, which was also acquired with a commercially available laser confocal scanning probe.

FIG. 2B shows an image 250 of a region of the surface of an Edison Blue Amberol cylinder. The field size is 1×0.91 mm, and is also acquired with a commercially available laser confocal scanning probe. The cylinders were modulated with the hill 280 and dale 260 method. In these cases, since there was no true continuous "surface" with which to work, an average value of the cylindrical surface needs to be formed. Note that the bottoms 130 have a vertical modulation clearly visible on edge face 285.

Figure 3A:
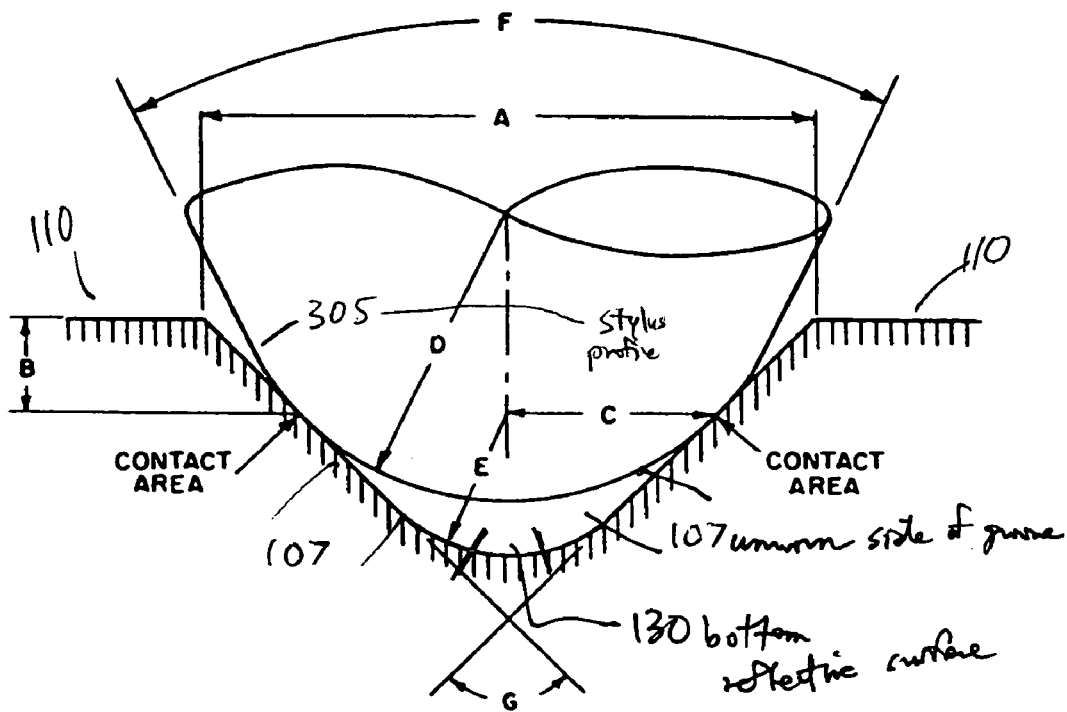
FIG. 3A is a section of a stylus in disc groove.

FIG. 3A shows a mechanical groove transverse profile. Here, it is readily apparent that the stylus profile 305 protrudes below the top surface 110 in playback, and leaves unworn the groove sidewalls 107 and bottom 130.

Figure 3B:
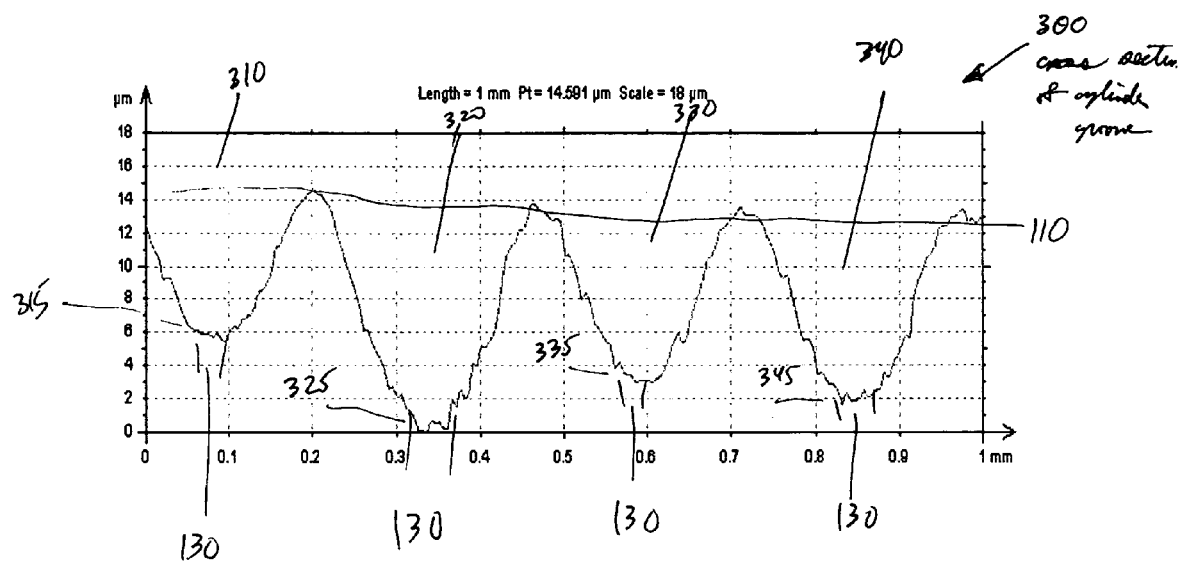
FIG. 3B is a section of cylinder groove.

FIG. 3B shows a cylinder groove profile 300. Here, grooves 310, 320, 330, and 340 have corresponding bottoms 315, 325, 335, and 345. The bottom profiles 130, however, are essentially the same, since they were produced by the same mechanical stylus. Also note that the top surface 110 slopes down from left to right, as would be expected when measuring the height profiles of a cylindrical surface.

In digital form, the images of FIG. 1A and FIGS. 2A and 2B are represented by lists of coordinates (traverse position X and Y, and intensity and/or height, Z) which may be manipulated and processed numerically in order extract metrological or other data from the images. With available computing tools, the image data generated in the scan of a phonograph record surface can be handled quite efficiently.

Recorded discs with lateral groove movement may be reconstructed in either two or three dimensions as appropriate for the condition of the sample.

Earlier recordings on cylinders, and on some disks, used a vertical "hill-and-dale" pattern to inscribe the audio data. To image such a pattern, the acquisition and processing preferably requires a de facto three-dimensional approach, as two-dimensional approaches, in X and Y, cannot track the vertical Z movement.

Metrological methods, as used here, scan the complete depth profile of a groove or vertically modulated structure with sufficient accuracy to resolve both the audio data present and the effects of wear and damage. These methods include laser profilometry (monochromatic and polychromatic confocal scanning), white light interferometry, digital sectioning, and stylus profilometry. In the last case, the surface is contacted, but by a low mass stylus typically incapable of doing any damage to the sample. In these approaches a complete map of the recorded surface would be built up for later analysis by two and three dimensional image processing and analysis methods.

Image analysis methods can be applied to model the local groove shape by appropriate mathematical functions or discrete series. Using these models it is then possible to: 1) calculate the motions the original stylus would have made when it passed along these grooves, and 2) filter or remove the effects of scratches, dirt, wear, wow, flutter, and tracking error through image analysis and transformations.

When imaging with an electronic camera, lighting options can affect the imaging strategy. With coaxial illumination it is most natural to image the groove bottom or the top edge. With other types of illumination alternative aspects of the groove could be imaged, such as the groove walls.

The methods are well-suited to the analysis of early recordings including those up through and including 78 revolutions per minute (r.p.m.) technology. In these recordings, the minimum deviation of the groove from an un-modulated path is on the scale of 0.5 microns. Such distances are resolvable with standard optical and video systems. With the advent of 33⅓r.p.m. microgroove recordings, the minimum undulation of the groove may become too small (possibly micron to submicron scale) to be easily resolved by simple imaging methods. More advanced approaches such as profilometry could be used, but after 1948 most original recordings were mastered on tape and relatively good (meaning largely undamaged) disk masters usually exist as well. It is the older media, 78 r.p.m. and earlier, which may be rare or endangered.

Reconstruction of mechanically recorded sound by image processing should be distinguished from the use of laser- or light-beam-based turntables. The latter either replace the stylus with a reflected light beam or scatter light off a mechanical stylus in contact with the groove. Both are therefore susceptible to the effects of dirt, damage, and wear in the groove. The methods discussed herein rely on the analysis of digitally imaged profiles of the recording.

Reconstruction of recorded sound by image processing can be applied to broken or warped media, and is not particularly sensitive to material composition or color. These methods can just as well be applied to "stampers", or record masters having an inverse profile, usually metallic, used to press or mold records in the duplication process. In such "stampers" the mechanical groove projects above the stamper mean surface.

The methodology applied herein is derived, in part, from analytical methods typically used in high-energy particle and nuclear physics to follow the trajectories of charged particles in magnetic fields using position sensitive radiation detectors. The methods also benefit from the development of tools used in the characterization of semiconductor devices, such as high resolution profilometry.

The reconstruction of data from groove recordings may also use two-dimensional optical metrology. Such reconstructions are more limited since they cannot capture the entire profile of the three dimensional defects residing in the recorded grooves.

Below, the metrological methods of audio reconstruction discussed here are applied to an example of a 78 r.p.m. disk manufactured around 1950 and to an Edison celluloid cylinder manufactured around 1920.

3. Examples of the Imaging Method

In this section, two image based reconstructions are described, using existing or easily available tools and methods. As a preliminary example, relatively little of the numerical optimization techniques discussed above were applied.

The first example procedure used a general purpose optical metrology system with digital image processing capabilities. The images were captured with an electronic camera. In this example the groove bottom was selected for analysis as a region less damaged by stylus wear.

In FIG. 4, an Avant 400 Zip Smart Scope (also coincidentally numbered 400), manufactured by Optical Gauging Products, is shown. It consists of a video zoom microscope optical system 410 and a precision X-Y stage 430. The accuracy of the precision table motion in the X-Y (horizontal) plane over the distance L (mm) is (2.5+L/125) microns. The video camera was a charge-coupled device (CCD) having dimensions of 6.4 mm×4.8 mm containing 768×494 pixels, each pixel having a dimension of 8.4×9.8 microns. With appropriate lenses installed, it imaged a field of view ranging between approximately 260×200 microns and 1400×1080 microns. The optical system 410 could travel in Z (vertically) on a vertical focus stage 470 with an accuracy of (4.0+L/150) microns. Associated with the system is a computer 440, and controller 460, and a monitor 450.

The Avant system included a software package containing a selection of image recognition tools useful for metrology. It could also be programmed to seek out known features on a part and repeat a measurement series at the user's discretion. Heights, and thus transverse and longitudinal profiles, could be measured by use of a focusing criterion.

In FIG. 3A, a typical groove cross-section is shown with a flattened bottom. The tip of the previously used phonographic stylus would have glided along the sides of the groove, but not typically on the bottom. Thus, the groove bottom is typically undamaged by mechanical stylus wear. This test used illumination coaxial with the optics to accent the bottom part as possibly less worn. Magnification was chosen to give a 700×540 micron field of view (FOV). Each pixel of the CCD then corresponded to 0.91×1.09 microns on the record surface.

In the context of electronic imaging, resolution refers to the statistical error on the measurement of a point and is due to the pixel size plus any additional effects of the optical chain. The pixel size effect implies the resolution will be:

$$\sigma = \frac{w}{\sqrt{12}} \tag{1}$$

where "w" is the image size width projected onto one pixel.

Based on Equation 1, the single point resolution of this system was 0.26×0.29 microns.

In this example, a particular procedure was implemented that was convenient to the available tools. A program was written to acquire a sequence of images similar to those shown previously in FIG. 1A. In each frame the groove bottom was measured with an edge finding algorithm. In this case the edge was the light to dark transition between the illuminated groove bottom and the sloping walls. Points were taken every 8 microns along the groove path, which corresponds to a sampling frequency of 61.3 kHz at a groove radius of 60 mm. Raw data, consisting of position coordinate pairs for these points, were written to a file. Dust or debris was generally skipped since no edge would be found near the groove path. In this way some image processing, and therefore noise reduction, was applied. The raw data was then processed.

This processing comprised a merge or stitching together of the frames into a global polar (R, θ) coordinate system, the removal of certain spurious points (filtering), global fits to account for overall systematic shifts, and numerical differentiation to transform groove displacement into stylus velocity. The data were then re-sampled at the CD standard 44.1 KHz and written out to a digital audio file in WAV format.

The test was performed on a 78 r.p.m. phonograph record that was manufactured circa 1950. This recording was chosen at random and was not in particularly good condition. No attempt was made to clean the record. FIG. 1A is an actual field from the surface of the record used in this test. The result of the scans and reconstruction was a 19.1 second sound clip. A 78 r.p.m. turntable and stylus was also used to play the same record back through a commercial phonograph pre-amplifier and computer sound card. Again the record was not deliberately cleaned. Both the optically reconstructed clip and the mechanically played clip were displayed with commercially available audio editing software. The phonograph pre-amplifier used applied the standard RIAA equalization curve to the audio signals. To compare on an equal basis, the actual frequency response of the pre-amp was measured and applied to the optical data using a software equalization tool in the audio editing package. In this example, no additional noise reduction process was applied to the digital audio files. Since this recording was made around 1950, the studio master had been recorded on magnetic tape. In this particular case the tape masters still exist. These original tape masters were used by the recording company to reconstruct a recently re-issued commercial recording on compact disc. The digital compact disc allowed for the comparison of the optical and mechanical playbacks of the record with a high quality studio version (the digital compact disc version). In the case of the compact disc version, the equalization used was not determined.

A set of figures is presented here to compare the respective different versions. These were displayed with the commercial audio editing software. Now refer to FIGS. 5A, 5B, and 5C, which respectively show the full 19.1 seconds for the optical reconstruction 510 of FIG. 5A, the mechanical stylus playback 520 of FIG. 5B, and the studio remaster CD versions 530 of FIG. 5C. Note that the noise 522, as well as the numerous pops 523 and 525 are readily apparent during stylus playback curve 520, but absent on the optical reconstruction 510 and studio remaster 530.

Refer now to FIGS. 6A, 6B, and 6C, which respectively show a portion of the sound of duration 40 milliseconds beginning at 3.261 seconds from the start of the optical clip for the optical 610, the mechanical 620, and the studio 630 versions respectively of FIGS. 5A, 5B, and 5C. This segment contains rich audio data. FIG. 6D is the audio data 640 as read directly from the record before differentiation into a velocity waveform.

FIGS. 7A, 7B, and 7C are of the same respective description as FIGS. 6A, B, and C except they are taken from a musically quiet portion of the recording (beginning at 17.661 seconds) for the optical 710, the mechanical 720, and the studio 730 curves respectively. Note here that a pop 525 is seen only in the mechanical stylus curve 720, as is noise 722, and a large defect, which likely gives rise to stylus tone arm mechanical vibrations 528. FIGS. 8A, 8B, and 8C show an averaged fast Fourier transform (FFT) spectrum for each of the optical 810, the mechanical 820, and the studio 830 versions respectively. Note that in the stylus playback trace 820, there is pronounced high frequency noise 825 from 5,525-10,026 Hz From these results a number of conclusions can be drawn. The fine waveform structures of all samples are qualitatively similar. This is particularly true of the optical and mechanical samples. The optically read sample contains far fewer sharp noise features (clips or pops) than the mechanically played sample and also contains higher amplitudes (with respect to the broadband noise) in the musically rich segments.

The studio version was, as expected, of higher quality than either the optical or mechanical sample. However the optical and mechanical samples were not subjected to any further digital noise reductions or re-mastering procedures.

One potential quality limitation may be in the process of differentiating the imaged waveform to obtain a velocity signal, which typically tends introduce noise. It is presently believed that at least some of the hiss heard in audio reconstructions using these methods is due to that differentiation. Various strategies remain open for further development including increased sampling and alternate digital signal processing algorithms. For example, if every pixel had been used as a sampling point, these images would have yielded a 400-500 KHz sampling rate.

The second example procedure used polychromatic confocal imaging to scan the surface of an Edison "Blue Amberol" celluloid cylinder. The confocal sensor had a spot size of 1.5 microns, a depth of field of 350 microns, a resolution of 10 nanometers and an accuracy of 100 nanometers. The cylinder was mounted on a rotating stage and the sensor was used to scan the surface heights along a line parallel to the cylinder axis. A set of such "slices" were made in 36,000 steps sequentially incremented by 0.01° around the circumference. A segment of such a slice is shown in FIG. 3B. For each slice, points were taken every 10 microns along the axis. The acquired data set consisted of the three coordinates: rotation angle; position along the cylinder axis; and height, for each measured point, analogous to that shown in FIG. 2B for a small region.

With the digital data an analysis was made to determine the positions and heights of the groove minima (valleys) and maxima (ridges) along each slice. These extrema were found by the process of fitting parabolic functions to the data. Using the quality of the fits and known constraints on the surface structure (such as regularity of the groove pattern) spurious points and damaged regions of the surface were isolated and then either corrected or removed.

The data were re-organized into a time series of groove heights or depths which followed the groove structure as it spiraled around the cylinder. The resulting series, which represents the undulations of the groove, was then numerically differentiated to find the velocity the stylus would assume as it played through this structure. Digital filtering was used to narrow the bandwidth of the reconstructed waveform into that region accessible to the cylinder technology. The digital filter also served to limit aliasing. The data were re-sampled at a digital audio standard of 22.050 KHz and converted to a standard digital audio WAV format.

The reconstructed results were compared to a recent transcription of the same source material which was played with a modern magnetic stylus.

Figures 9A, 9B:
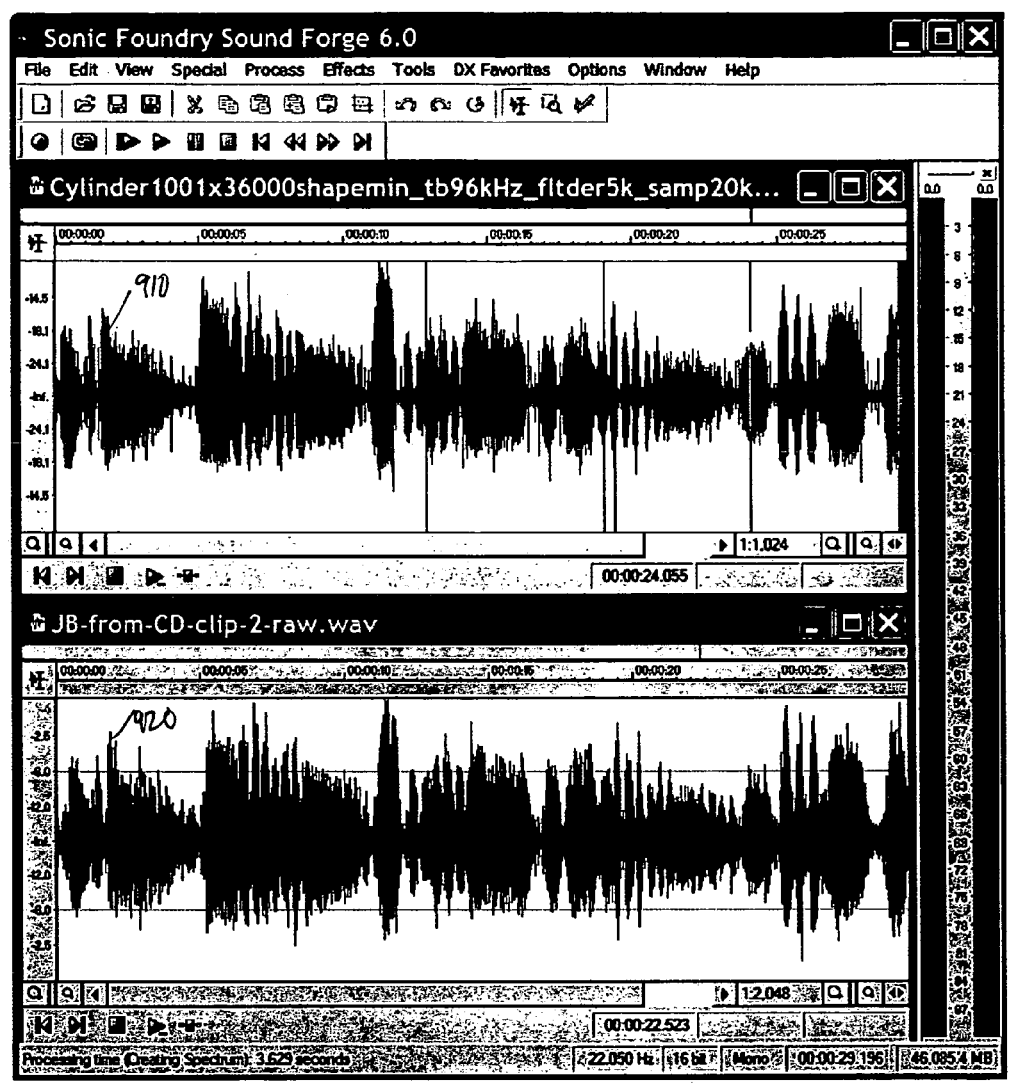
FIG. 9A is a sequence of data points taken along the two imaged edges of the groove bottom plotted as a radial coordinate in mm (vertical axis) versus θ, an angular coordinate in radians (horizontal axis). A series of overlapping camera frames are shown. The discontinuity (radius shift) between adjacent overlapping intervals is the issue addressed below in Step (3) of the data processing.
FIG. 9B is each point pair of FIG. 9A averaged across the groove bottom to form a single data stream, showing that this redundancy results in some smoothing of the data. Overlapping consecutive frames are shifted to remove frame to frame offsets.

The results are shown in FIGS. 9A and 9B which respectively compare the full audio clip reconstructed by this method 910 and playback by a mechanical stylus, or needle 920.

FIGS. 10A and 10B respectively compare a short time segment of the preceding FIGS. 9A and 9B to detail the fine waveform structure in the reconstructed curve 1010, and the playback curve 1020.

Figure 11A:
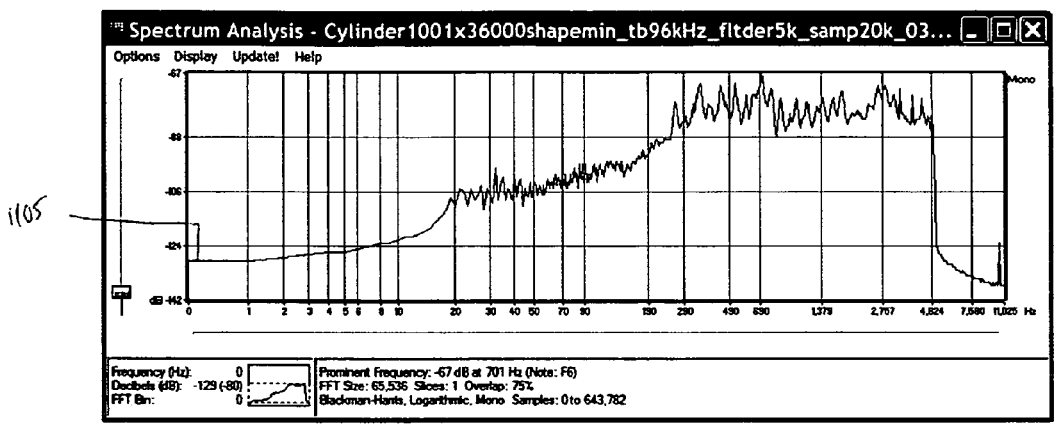
FIG. 11A is a fast Fourier transform (FFT) spectrum of the optical sound clip of FIG. 10A.
Figure 11B:
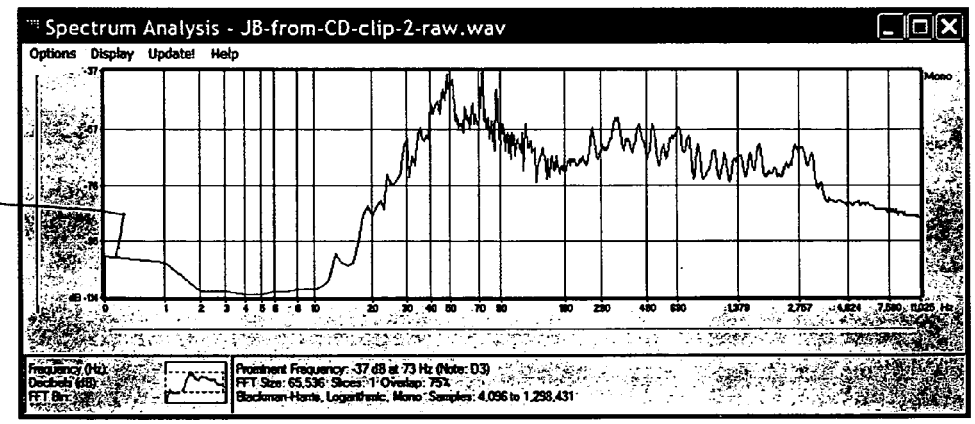
FIG. 11B is a FFT spectrum of the stylus played back sound clip of FIG. 10B. Note that the excess low frequency "mechanical" noise content below about 150 Hz in the stylus playback version is absent in the optical version.

FIGS. 11A and 11B respectively compare the Fast Fourier Transform (FFT) spectra in curves 1105 and 1115 of FIGS. 9A and 9B. A good correspondence was found for the waveforms, with matching frequency peaks in the richer audio content portions. At low frequencies, where various clear artifacts can be heard in the stylus version, the optical version was cleaner, and demonstrated an audibly improved result.

The following is a more detailed description of the issues underlying these methods and the algorithms implemented in the examples given.

4. The Imaging Method

In order to establish a basis for precision metrology and digital image processing, applied to mechanically grooved recordings, it is useful to summarize the relevant mechanical properties of such recordings. The specifications for modern disk records are in the literature. The corresponding specifications or characteristics for the now obsolete 78 r.p.m. and cylinder technologies are out of print, but may also be found either from other alternate sources or by explicit measurements.

The magnetic playback stylus signal is proportional to its transverse velocity due to the transverse groove movement during playback. The older acoustic stylus signals are also proportional to stylus velocity through the coupling of the stylus to the horn diaphragm, and through such coupling to the air pressure/velocity modulation.

Signals are compared on the basis of amplitude rather than power in decibels (dB):

$$dB = 20\log\left(\frac{v}{v_{REF}}\right) \quad (2)$$

where v is the stylus velocity and $v_{REF}$ is a defined reference level, discussed below.

For a sinusoidal modulation, the signal amplitude output from a stylus will be maximal at the zero crossings of the groove. The maximum lateral displacement of the groove corresponding to a zero crossing velocity $v_{MAX}$ is, $$A_{MAX} = \frac{v_{MAX}}{2\pi f} \quad (3)$$

where f is the frequency of the recorded tone. From an image of the groove pattern, the lateral displacement of the groove with respect to the un-modulated trajectory is measured on a sequence of points. The measurement of stylus velocity, at each point, is extracted from this displacement waveform by numerical differentiation.

Equation 3 states that for constant stylus velocity the maximum groove displacement depends inversely upon frequency. In many lateral disc recordings the lower frequency sound levels are deliberately attenuated so as to increase the range of signals that will fit in the groove spacing allocated. In addition, higher frequency sound levels are often boosted to overcome the inverse frequency drop off of Equation 3 and to raise such higher frequency signals above a high frequency noise floor due to "surface noise". This surface noise is inherent to the mechanical recording process. For lateral disc recordings before the early 1950's this process of equalization was not standardized, but many of the curves have been tabulated. Acoustic recordings are not explicitly equalized.

Before defining the basic physical parameters of the mechanical recording it is useful to summarize the various noise sources that may be encountered. In the literature of mechanically recorded sound it is common to refer to effects that are either random, or systematic and distorting, as "noise".

Surface noise or hiss is a random high frequency noise that is due to imperfections in the surface medium that forms the transverse and longitudinal profiles of the mechanical groove. These imperfections are inherent in the material used to make the record, but may increase due to effects of age and wear. In general a stylus will be very sensitive to the groove surface. Depending upon the imaging strategy and sampling method applied, an optical approach may be less sensitive to the surface quality. The frequency spectrum of surface noise remains flat up to the highest audible frequencies. Since the surface noise is random its measure would be the standard deviation of the surface noise velocity or amplitude distribution about an un-modulated groove trajectory.

Transient impulse noise or "clicks and pops" is noise due to discrete imperfections or damage sites along a groove, such as a scratch. The noise pulses are of short duration but may have a very large amplitude. They occur at random times but are typically isolated. From an imaging approach such defects are resolved and can be handled by basic image processing methods in combination with numerical interpolation techniques. If they are removed from the data, then the lost portions may be estimated (or interpolated) from the surrounding groove profile. This interpolation is loosely related to what is done in some noise reduction systems that use mechanically played back data (of which, some are analog), however, interpolation has a greater effect of reducing clicks and pops, and a lesser effect on the remaining signal. In an imaging approach more information is available about the offending structures that give rise to click, pops, and other noise sources. Many of such offending noise source structures may be fully visualized and may thus be removed. Any dynamic effect on the stylus motion that persists after the impulse, including a complete skip, will also be absent when imaging methods are used.

Wow and flutter are low frequency noise effects which are probably due to variations in motor speed, off axis position of the center hole in the record, acoustic feedback, and non-circular groove shape to indicate a few. The quoted frequency ranges describing such noise sources are below 6 Hz for wow, and between 6 and 30 Hz for flutter. These are not technically noise, but rather systematic distortions that affect the performance of the system, and therefore affect playback. They are typically characterized as some maximum allowed deviation from an un-modulated groove rather than by a statistical measure. In an imaging approach these effects are essentially irrelevant since they are either absent or can be removed through shape parametric analysis.

A few of the important mechanical parameters of interest for precision metrology and digital imaging are listed below. Some relate to FIG. 3A which depicts a disc groove profile and FIG. 3B which depicts a cylinder groove profile. Where relevant they are defined at a specific frequency (1000 Hz) where equalization effects are generally not an issue.

Groove width is the distance across the top of the groove (dimension A in FIG. 3A).

Groove spacing is the center to center distance between two adjacent grooves.

Grooves per inch ($G_d$) is the number of grooves cut in the surface per radial inch.

Reference signal level is the peak transverse velocity used to set a baseline for the recorded signal. This quantity is in principle arbitrary but is key to defining the noise and dynamic range discussed in the literature.

Maximum groove amplitude is the maximum displacement of the groove from an un-modulated or un-cut path.

Noise level below reference level (signal to noise ratio) is a noise level or limit that is usually expressed as dB below the reference signal, and may be referred to as S/N ratio. This is taken to mean the standard deviation of any random noise source such as the underlying surface noise source discussed above or the maximum allowed deviations due to the low frequency systematic effects.

Dynamic range is a measure of the range of audible signals up to the maximum peak recorded signal level, defined here with respect to the noise level at 1000 Hz.

Groove amplitude at noise level is the maximum amplitude deviation from a signal free path corresponding to the noise level in item 6) above and defined in Equation 2.

Maximum and minimum radii are the respective radii at which audio data is specified to begin ($R_{MAX}$) and end ($R_{MIN}$). These radii apply only to disc recordings. Cylinders have a fixed radius.

Area is the area covered by audio data. For a disc area is:

$$\text{Area} = \pi(R_{MAX}^2 - R_{MIN}^2) \quad (4)$$

For a cylinder of cylindrical length L, area is:

$$\text{Area} = 2\pi RL \quad (5).$$

Total length (TL) is the path length along a single complete longitudinal groove from between the two radial extremes:

$$TL = G_d \times \text{Area} \qquad (6)$$

These parameters are presented in Table 1 for the 78 r.p.m. coarse and 33⅓ r.p.m. micro-groove and cylinder technologies. The units used follow the past conventions where applicable.

this at the expense of a larger data set. Known mechanical constraints in the media under survey can also be used to correct the data.

For a scan with a digital camera, a minimum typical data size captured in a single monochromatic frame is ~1 Megabyte. A reasonable field of view for the measurement of the groove pattern is the 700×540 microns (0.378 mm²) used in the example shown. From Table 1, the recorded surface area

TABLE 1

Basic mechanical parameters of some lateral groove recordings.

| Parameter | Coarse | Micro-Groove | Cylinder |
|---|---|---|---|
| Diameter inches | 10–12 | 12 | 2–5 |
| Revolutions per minute | 78.26 | 33.3333 | 80–160 |
| Groove width at top | 150–200 μm | 25–75 μm | variable |
| Grooves/inch $G_d$ | 96–136 | 200–300 | 100–200 |
| (mm) | (3.78–5.35) | (7.87–11.81) | (3.94–7.87) |
| Groove spacing | 175–250 μm | 84–125 μm | 125–250 μm |
| Ref level peak velocity @ 1 KHz | 7 cm/sec | 7 cm/sec (11 μm) | unknown |
| Maximum groove amplitude | 100–125 μm | 38–50 μm | ~10 μm |
| Noise level below ref, S/N | 17–37 dB | 50 dB | unknown |
| Dynamic range | 30–50 dB | 56 dB | unknown |
| Groove max ampl @ noise level | 1.6–0.16 μm | 0.035 μm | <1 μm |
| Max/Min radii mm | 120.65/47.63 | 146.05/60.33 | fixed |
| Area containing audio data | 38600 mm² | 55650 mm² | 16200 mm² (2") |
| Total length of groove meters | 152 | 437 | 64–128 |

From the mechanical parameters described above, some of the basic requirements of a measuring and data processing system may be derived. The fundamental requirement is on measurement resolution and accuracy.

In the context of electronic imaging, resolution refers to the statistical error on the measurement of a point and is due to the pixel size plus any additional effects of the optical chain. The pixel size effect on the resolution is given by Equation 1. Accuracy refers to the possibility of discrete shifts of data between pixels and is attributed to timing or phase jitter in the electronics chain that reads out the image.

In the context of the three-dimensional surface metrology methods, the resolution may have contributions to pixel size effects in the sensor as well as the following effects: noise in the sensor, optical aberrations, diffraction effects, fluctuations in the reflected signal. Accuracy may also be affected by non-linearity in response and calibration effects.

Requirements on these effects are essentially set by the intrinsic record noise level, i.e. the output audio extraction should be no more noisy than the initial signal to noise ratio and the noise floor. The metrology process stands to add additional noise to the sample if the accuracy and resolution are worse than the intrinsic noise. The effect is actually magnified since audio extraction is done by differentiating the measured groove pattern. This magnification is dependant upon the process used to differentiate and the sampling rate. In addition, poor resolution will smear the waveforms leading to a loss of information.

Having determined the basic measurement accuracy and resolution, an appropriate imaging system can be selected and/or designed. There will be several tradeoffs between magnification, field of view, number of pixels, data rate, and spot size. Such optimizations are the subject of various published discussions. In surveying the surface of a record, the imaging system will scan over a number of positions. The mechanical motion may induce an additional shift error. If adjacent frames overlap, the data can be used to correct for on a 10 inch, 78 r.p.m. coarse groove sample requires about $10^5$ such fields for complete coverage, assuming the data is efficiently used. About $10^6$ fields would be required if just a single groove segment were scanned at any one step. The total image data set generated is then 100-1000 Gbytes before processing. While large, this is still manageable using present-day hardware. As opposed to real-time audio playback, in an audio restoration application there is no firm requirement on the reading speed of the measurement system except that of overall throughput if many discs are to be surveyed. As an example, a system which scans the record surface in real-time with an electronic camera would generate between 0.5-5 Gbytes/second. Again, such a data stream could be handled if sufficiently parallelized. It is common in machine vision applications to follow the sensor directly with a fast digital signal processing module which can usually reduce the data size considerably before transfer to a host computer for further processing.

For a scan with a confocal probe, a sequence of arrays of points would be acquired over the surface on a particular grid. This grid is determined by the sampling rate (in the direction of rotation) and by the groove width (in the direction orthogonal to that). The latter requirement is for sufficient points to determine the groove profile from the samples. For example, to cover the surface of a 2" cylinder at a high temporal sampling rate, e.g. 96 KHz, approximately $5 \times 10^8$ points are required (~1 Gbyte).

Imaging the grooves includes important advantages over standard stylus playback methods. For instance, some old recordings, which are of historical, scholarly, or perhaps commercial value, are considered too delicate or otherwise compromised to read with a stylus. The imaging methods are essentially or totally non-contact.

Old recordings are often damaged by dirt and scratches or simply worn down by repeated playing with a needle, which results in mechanical abrasion. Using image analysis methods and illumination options including intensity, angle of incidence, and wavelength, the damage and debris may be removed (filtered) since they may be recognizable as different from both the transverse and longitudinal mechanical groove structure. The effects of wear may be overcome by sampling regions of the groove away from where a stylus would run or using interpolation or correction methods. The groove bottom may be included in such methods. The groove bottom may be relatively free from the effects of scratches and wear, and thus represent relatively clean data. This technique is similar to the use of a truncated or specially shaped mechanical stylus that does not contact the groove bottom.

Existing audio methods for improving the quality of recorded sound utilize filters and reconstruction methods that are applied to the already played back signals in the time or frequency domain. The imaging method performs a reconstruction and filtering in either the spatial or image domain, or both, where the noise actually originates, through the acquired image alone.

Dynamic effects of damage or debris, which may excite a resonant or disruptive response in a mechanical stylus, cartridge, and tracking arm, are absent in an optical or precision profilometric reading of the grooves.

These methods may be applied to any medium upon which the recording is made including, but not limited to, members of the acetate family, glass, wax, paraffin, lacquer, shellac, varnish, vinyl, celluloid, metallic soaps, aluminum, copper, zinc, a metal, a metal alloy, and a thermoplastic. Broken, warped, or severely warped media may also be reconstructed. Inverse "stampers", used in the duplication process may be reconstructed as well.

Various sources of distortion and noise such as wow and flutter, tracing error, pinch effects, and tracking errors, are either absent using this method, or may be resolved as simple geometrical corrections in the numerical analysis.

Systems that read records or cylinders by means of just a reflected light spot must include a mechanical mechanism for following the groove. If individual image data frames are acquired, the data itself may be aligned in software by aligning and matching adjacent frames with the possibility of using encoder read back and stage indexing for gross ph{sical location of the individual frames.

After an image based reconstruction, any of the existing digital noise reduction or re-mastering techniques can also be applied to further enhance or otherwise alter the sample.

Considerations of the following factors will likely lead to an optimal digital audio extraction:
(1) The resolution and accuracy of the entire imaging and data chain must be sufficient to measure the undulations without introducing excess noise or smearing of the signals. Field of view and magnification tradeoffs must be considered.
(2) The mechanical indexing must be accurate enough to allow coarse spatial correlation of adjacent frames.
(3) An optimized digital signal processing algorithm would preferably be used to determine the modeled stylus velocity through the process of numerical differentiation without adding excess noise.
(4) Sufficient points (sampling rate) need to be found along the groove for correct modeling.
(5) Processing time and data storage requirements increase if less pre-processing is done in the initial acquisition chain, and/or more points are sampled, or higher spatial resolution is used.

The methods discussed here are not necessarily meant to play the recording back in real time; however, given sufficient resources, this could also be possible. Rather they extract sufficient information from the sample to enable noise reduction processing as required.

5. Detailed Data Acquisition and Processing Method

In this section a detailed discussion is given of the algorithms used to perform the analysis of the test examples given earlier.

To carry out the first test, which was on a 78 r.p.m. disc, a particular procedure limited to only those features available in the SmartScope and MeasureMind system. A program was written that measured the hole in the disc center with the circle finding tool. A Cartesian coordinate system was then established with the origin at a chosen point on the disc and the axis aligned to the disc center. The built in edge finding tool was used to measure the groove bottom in the field of view (FOV) around the origin. Since the groove trajectory spirals inwards, on average, the SmartScope was able to follow the groove frame by frame and re-established the origin at each step. A sequence of images like FIG. 1A were acquired and processed. In each image frame the two sides of the groove bottom were measured with the edge finding tool. In this case the edges were the light to dark transitions between the illuminated groove bottom and the sloping walls. Point pairs were taken every 8 microns along the groove path. This corresponded to a sampling frequency of 61.3 kHz at a groove radius of 60 mm. Raw data, consisting of coordinate pairs for these points, were written to a file. Dust, debris, and scratches were generally skipped since no edge would be found near the groove path. In this way the image processing procedure inherent in the edge finding algorithm resulted in some noise reduction. The raw data was then processed offline, using the following steps.

Data from each frame was merged into a global polar (R, θ) coordinate system. Here R is the distance from the disk center and θ measured the azimuthal position from the starting point.

The groove bottom was found to have an average width of ~7 microns. Using the position correlations of data points on each side of the groove bottom, spurious points were removed from the data (filtering). The good point pairs on either side of the groove bottom are shown in FIG. 12A for a set of frames.

Figure 12A:
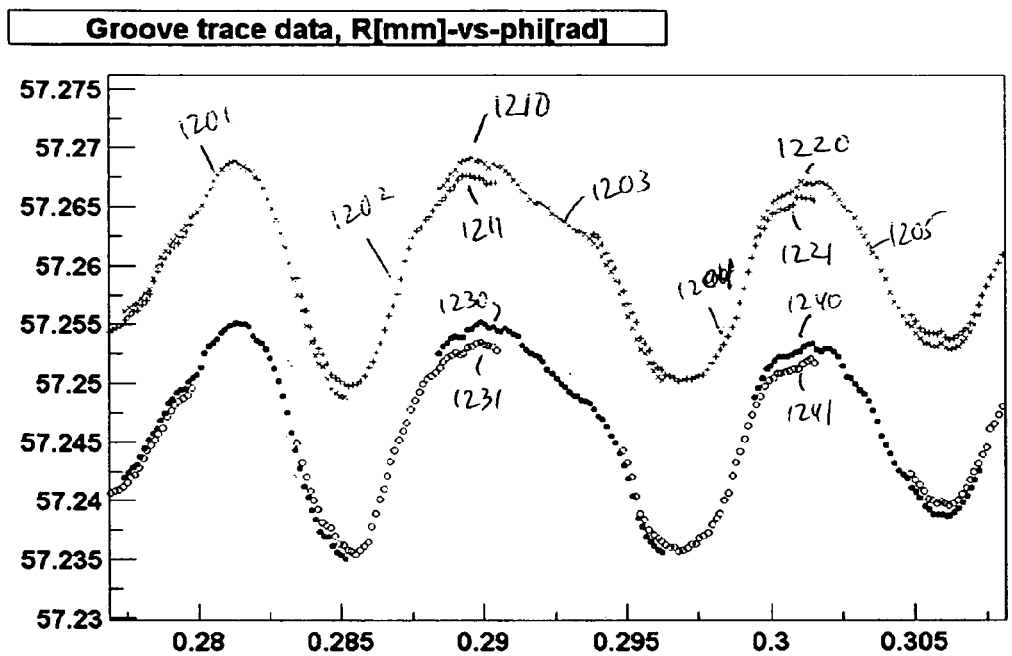
FIG. 12A indicates the data manipulation involved in the stitching together process of reconstructing a 78 r.p.m. phonograph disc record from a series of data segments. A sequence of data points taken along the two imaged edges of the groove bottom plotted as a radial coordinate in mm (vertical axis) versus θ, an angular coordinate in radians (horizontal axis). A series of overlapping camera frames are shown. The discontinuity (radius shift) between adjacent overlapping intervals is the issue addressed in Step (3) of the data processing.
Figure 12B:
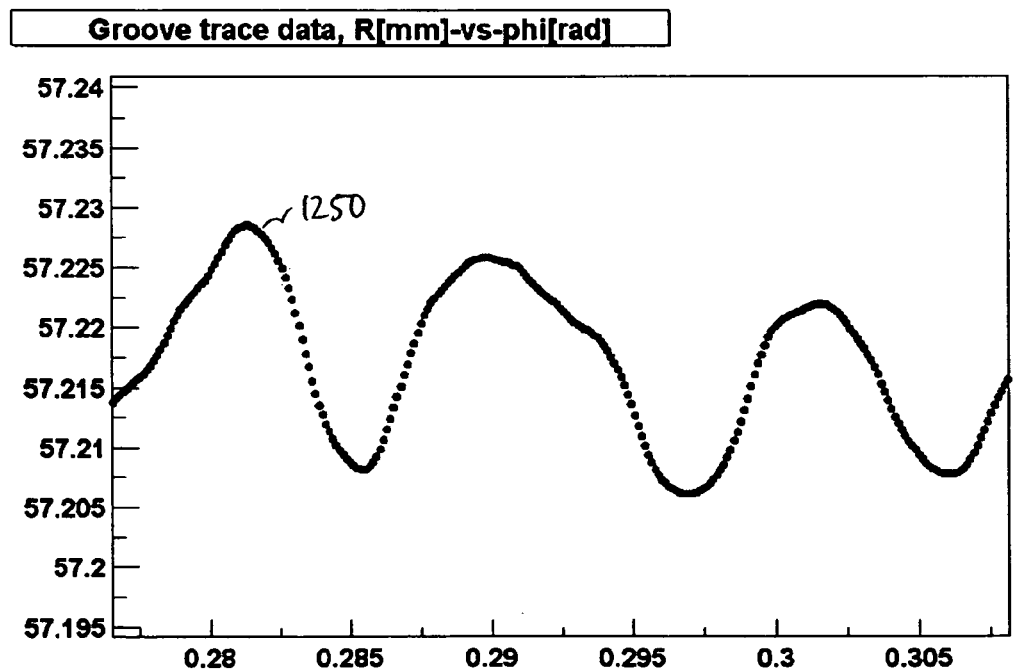
FIG. 12B plots the point pair of FIG. 12A averaged across the groove bottom to form a single data stream. This redundancy also results in some smoothing of the data. Overlapping consecutive frames are shifted to remove frame to frame offsets.

Refer now to FIGS. 12A and 12B. Here we see a contiguous set of samples 1201, 1202, 1203; 1204, and 1205. These sets are correlated to overlap with minimum squared error. That is, peak 1210 is matched with peak 1211. Likewise, peak pairs 1220 and 1221 are paired, 1230 and 1231 are paired, and 1240 and 1241 are paired. The good point pairs on either side of the edge were averaged. Small mechanical shifts, seen in FIG. 12A, existed due to movements of the mechanical stages. Typical shifts were ~1 micron. As shown, data were acquired in (approximately) 25% overlapping segments and this redundancy was used to remove the shifts by aligning consecutive frames. The data following this step is shown in FIG. 12B trace 1250.

The variation of the R coordinate with θ for the measured points is the result of the audio signal resulting in the transverse modulation of the groove radial position, the natural groove spiral shape, the effect of the disk center determination uncertainty, and (possibly) the manufacturing distortions, such as "wow". To minimize all error sources, except the signal, the data were fit to a functional form $R'=R_0+C\cdot\theta'+A\cdot\sin^2(\theta'\cdot\theta_0)$ using the Minuit software package. Here the R' and θ' are different from R and θ in that the former pair are recalculated from the latter by taking into account the proper disk center. The form of this function is natural, where: $R_0$ and $\theta_0$ account for offsets, the "C" term is the normal spiral groove trajectory for a constant radial velocity cutting, and the "A" term models the "wow" effect. The difference between R' for an individual point and the function shape gave the "signal" due to the recorded sound.

Figure 12C:
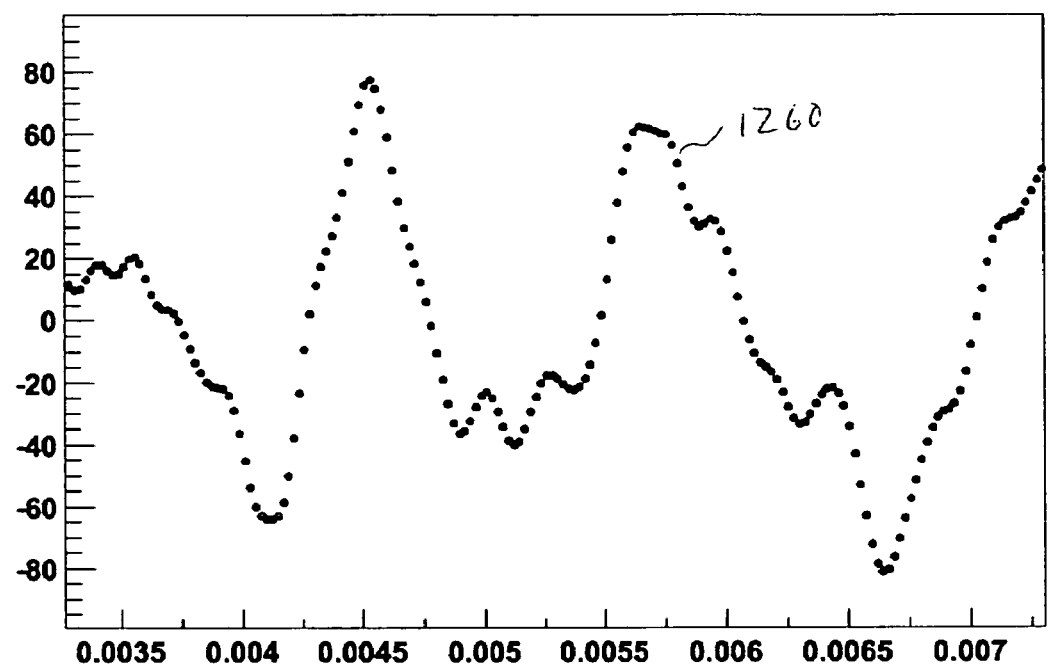
FIG. 12C shows the numerical derivative is taken at each point in FIG. 12B by performing a chi-squared minimization fit of a 4th order polynomial to the set of 15 points centered on that point. The polynomial is differentiated analytically (i.e. by analytically differentiating the polynomial) and the derivative plotted as a point at the same angular coordinate and displayed in this plot.

The resulting waveform was numerically differentiated and then resampled to obtain the corresponding stylus velocity. For each point, a group of nearest 15 points was fit to a $4^{th}$ order polynomial using $\chi^2$ minimization. The velocity was obtained as the analytic derivative of the fitted function evaluated at the nearest point corresponding to the CD standard sampling frequency of 44.1 KHz. Each fit was independent and no constraints were imposed, however consecutive fits shared many common data points. This method may not be optimal for audio data with some continuous noise present, however was found to work well for the purposes of this test. It was seen to work better than a simple two point difference derivative and slightly better than fits to fewer points or to lower order polynomials. The differentiated and re-sampled data 1260 is shown in FIG. 12C.

The data were converted into WAV format, a common digital audio file standard. Results of this test were discussed previously in Section 3.

To carry out the second test, which was on an Edison "Blue Amberol" celluloid cylinder, numerical methods were applied to the three-dimensional metrological data acquired with the confocal probe and stage system.

As indicated above in Section 3, the data scans were taken in slices along the cylinder central axis with incremental rotation about the axis. The grid spacing was 10 μm along the cylinder axis and 0.01° (~5 μm) about the cylinder axis.

The analysis initially followed the acquired data structure by finding local groove minima (valleys) and maxima (peaks) for each angular slice. Slices were then looped over for each angular position.

For each slice, minima and maxima candidates were identified as data points which were not higher (lower) than the two preceding and two following points. Some of these candidates can be false or undesirable, due to material damage and extraneous particles (dust or debris).

Bad candidate extrema were removed, or filtered, using the inherent data periodicity of the known groove structure. The correct groove bottoms (and tops) form a grid having a fixed distance between adjacent neighbors. For the scanned sample this distance was found to be T=0.1271 mm, close to expectations for this type of cylinder (200 grooves/inch). A relative phase of the grid on the cylinder length axis was found. For this, a $\chi^2$-like quantity was formed based on least squares, $$Rsum = \sum_{k=1}^{N} IR\left(\frac{x[k]}{T} - phase\right)^2$$

where IR(y) is the difference between and y the nearest integer value, N is the number of extrema in the slice, k an index over extrema, and x[k] the position of the $k^{th}$ extrema along the cylinder axis. This quantity was minimized, with respect to phase, to find the minimum values of $Rsum_{min}$ and $phase_{min}$. Then the set of candidates was scanned and the points with $$IR\left(\frac{x[k]}{T} - phase_{min}\right) > 3.0 \times \sqrt{\frac{Rsum_{min}}{N}}$$

were identified as outliers. They were removed from the list of extrema.

The groove ridge heights were taken from the list of maxima identified in the previous step. For the valleys, a list of nearby points was formed from the found minimal point and 10 nearest neighbors in the slice. Points were removed from this list if they belonged to the list of adjacent maxima. This set of points was fit to a parabola with fixed a fixed quadratic term. The cutting tools used to imprint the vertical undulations on a particular cylinder are assumed here to have negligible wear over the course of the transcription. Only the groove position and height change. The parabolic shape is a simple approximation to a short circular segment, and appears to fit the local groove shape well. For this particular cylinder example, the quadratic term was fixed at 3.853 mm$^{-1}$ corresponding to a 130 μm radius for the cutting tool. By first fitting a large sample of grooves with no fixed term this best estimate of the quadratic term was determined. For the parabolic fit, a $\chi^2$ minimization method was used. The allowed free parameters were only the parabola minimum position and height. The individual point error was assumed to be σ=0.22 μm based upon the width of the deviations observed in the data distribution, and the known characteristics of the measurement system. The fit was iterated again after any points deviating more than 3σ were removed. The fit iteration cycle was stopped if no points deviated by more than 3σ or only 5 points remained. Constraining the data to lie on this parabola is analogous to the simple (7 micron) edge-to-edge distance selection for two-dimensional scanning discussed above in the first example The list of fit minima was filtered on the basis of periodicity similar to that discussed above. This was done to remove spurious fit results, some of which came from the region near the end of the scan where the full groove cross-section was not available.

With a set of groove extrema at fixed angular position relative to the cylinder axis, the data was then re-organized into a time series that followed the spiral trajectory of the groove bottom. This was done by establishing "seed" groove bottom positions off the first slice. For each position, the groove bottom (ridge) positions in the next slice were located in the minimal distance along the cylinder axis. If the minimal distance was less than 30 μm, then the position was attributed to the same groove, and the seed value was updated to that of the next slice. The groove position on the cylinder was traced in this way. As the result of the iterative fitting and periodicity filtering described, data would naturally be missing when the groove shape is corrupted. The distance matching criterion is sufficiently loose to continue tracing the groove in case of missing data The data, fit and re-ordered, contains 36,000 points per cylinder rotation, corresponding to the 96 KHz sampling for 160 r.p.m. cylinder rotational rate. Any missing points, due to cuts discussed above, are linearly interpolated from the neighboring longitudinal profile points. At least three data streams can be derived from this set:

(1) The groove bottoms can be considered as a stand-alone data stream.
(2) The groove top (ridges) can be considered as a stand-alone data stream.
(3) The groove bottom position can be considered with respect to the top position.

In this way the local surface imperfections can be subtracted out using the groove top to track the generic cylinder surface shape. The groove top determination for a given slice is less precise than the bottom, because fewer measurement points were used in determining its height value, and potentially because of more wear. Therefore, a point-by-point bottom-top subtraction would introduce some noise. Instead, a low sampling frequency template was made by averaging every 100 top points corresponding to one degree of axial rotation. Each bottom height value was referenced to a parabolic interpolation of the local top value taken from three nearest points of the top template. Due to the low sampling frequency of the template, the correction for the surface irregularity was restricted to low frequencies.

Excess frequency content is filtered using a Fast Fourier Transform (FFT) method. This is done both to satisfy the Nyquist criteria before resampling, to an appropriate digital audio rate, and because the recorded cylinder and acoustic horn technology has only a limited frequency content. In addition, the sound amplitude is proportional to the stylus velocity, rather than displacement, for most of the frequency domain. The measured groove depth distribution is differentiated to determine the stylus velocity. The differentiation is accomplished by multiplying by $i\omega$ in the frequency domain (the factor of i serves to preserve the relative phases between different frequencies). The filtering and differentiation steps are done simultaneously by constructing the following multiplicative term for the frequency amplitudes:

$$M = \begin{cases} 0 & \text{for } F < 20 \text{ Hz} \\ i\omega & \text{for } F \in [20 \text{ Hz}, 4.8 \text{ KHz}] \\ i\omega \times \left(1.0 - \frac{(F-4.8)}{0.4}\right) & \text{for } F \in [4.8 \text{ KHz}, 5.2 \text{ KHz}] \\ 0 & \text{for } F > 5.2 \text{ KHz} \end{cases}$$

The cut below 20 Hz removes the low frequency structure in the bottom-only data due to cylinder shape irregularities.

The 400 Hz transition to zero at 5.0 KHz was used to avoid any ringing pattern triggered by jumps in the data. All the data from the scanned sample could not be easily processed simultaneously, due its size. Instead, one second long samples were sequentially treated. The filtering was done in 100,000 points space, of which 96000 points corresponded to the scanned sampling frequency. Two "zero-padding" regions of 1000 points lengths were placed before and after each such chunk of data, with same length linear transitional regions in between. This was done to avoid mismatching jumps between sequential samples.

The cut at 5.2 KHz also satisfies the Nyquist criteria before re-sampling to a lower digital audio standard. The list of filtered height measurements was rescaled to 16 bits space, and converted to WAV format with 22.05 kHz sampling.

FIGS. 13A, B, and C are from the analysis of the optical reconstruction of the celluloid cylinder recording. FIG. 13A is based upon a measurement of the groove bottoms only, FIG. 13B is based upon a measurement of the ridges between grooves only, and FIG. 13C is based upon the difference between groove bottoms and (averaged) ridges, as described below. The audio data is shown in FIGS. 13A, B, and C for the three respective streams 1310, 1320, and 1330. Interestingly, the groove top stand-alone stream of FIG. 13B, curve 1320 contains audible, albeit noisy sound, with some interference from different times in the recording. This may be due to the residual localized pressing of the carving tool on the nearby surface. The pressing on the two grooves on both sides of a ridge can create the mentioned interference.

Due to the sound content of the top and the possibility of some "self-subtraction", the top/bottom subtracted method is not very theoretically satisfying. Due to the logarithmic perception of the sound amplitudes, the amplitudes in samples would have to be very close for the audible degradation to occur, however, as a practical matter there is little audible degradation. The implicit correction for global cylinder shape is valuable and therefore this approach is still attractive.

6. Design of a Specialized Machine

In a refined or optimized version of the methods described herein, surface scans or images would be captured with dedicated sensors. Custom designed image analysis is applied to extract substantially more information from the mechanical groove transverse and longitudinal geometries. A set of dedicated image based noise filters and groove surface reconstruction routines may be used. An optimized optical system is used, which includes appropriate sensor or camera performance so as to maximize resolution and accuracy. A dedicated X-Y-Z-Θ (rotating) movement system may be used to enable faster access to the medium. Alternate imaging and profilometry techniques may be applied as well, such as light color, angle, and intensity as discussed above. Additionally, special mechanical scanning methods may be used to read cylindrical media as opposed to disk media by coupling to a rotating stage assembly and using appropriate three dimensional scanning and imaging methods.

For broken or damaged media, special reconstruction software may also be used to re-assemble the tracks. An alternate integrated embodiment could comprise a sound preservation workstation comprising hardware and software designed to handle the various media desired. This workstation could further comprise a suite of metrology tools, which would be applied as needed.

With dedicated processing hardware, optimal use of the imaged field or grid, and faster sensors or large format cameras and/or multiple sensors, cameras, or scanners, a dramatic increase in the speed of this process could be possible. The raw image data produced by the scan of a 78 r.p.m. record with an electronic camera is in the range of 100-1000 Gbytes with no pre-processing. If the record is scanned in real-time, this data flow rate corresponds to 0.5-5 Gbytes/second. While this is a fairly high data rate, it is not unusual in the context of modern high speed on-line data processing, such as is used in the triggering and data acquisition systems of high energy physics experiments. Considerable parallelism is often applied to such incoming high speed data streams, and preliminary data reduction is done by using dedicated hardware or firmware.

7. Conclusions

The basis for digital image processing and precision metrology, applied to mechanical sound reconstruction, has been described. Two non-contact reconstructions of analog audio data from groove recordings have been demonstrated in two examples. The quality of the audio extraction (as judged by the inventors) is already better than that achieved by stylus playback with good components before any other digital noise reduction methods are applied. Considerable options exist for improved image processing and further noise filtering. Application specific hardware and software could lead to significant reductions in the time required to perform a scan and further improvements in data quality. These attributes may lead to a real advantage in the preservation of endangered audio media of historical or other value and for the mass digitization of mechanically recorded sound collections.

8. General Principles and Features of the Invention

While the invention has been described above in terms of particular embodiments, the invention is not so limited. The following are general principles and features of the invention, which may be carried out in various embodiments.

A basic feature of the invention is the use of imaging methods and metrology as a tool to reconstruct audio data stored in the modulations of mechanical grooves in a medium such as a disk or cylindrical recording.

The data that is reconstructed is originally analog (the groove motions are an analog representation of the data). The data is acquired through the imaging and metrology process and then digitized for further processing into sound files or an audio extraction.

As used herein, groove means any continuous mechanical modification of the surface. This can be a side to side modulation ("lateral recording") or an up-down "hill and dale" modulation ("vertical recording").

As used herein, imaging refers to any process which collects into some defined group ("the image") a value, or set of values, representing either light intensity, color and/or phase or profilometric coordinate information on a set of points X, Y, and Z on or about the surface of the recording medium under measurement. For this description, x and y are orthogonal coordinates in a plane parallel the surface of the medium (disk) or in a plane tangent to the surface of the medium (cylinder) and z is the third coordinate perpendicular to the x-y plane (depth). The image can be acquired by any number of different procedures including with an electronic camera (such as a CCD or CMOS camera) which contains a 1 or 2 dimensional array of sensor elements or by a scanning method whereby the 2 or 3 dimensional image is built up out of set of individual point measurements.

As used herein, processing refers to at least two steps. In the first step the digitized image data is analyzed in order to extract the groove movement, filter noise, and/or reconstruct damaged regions, and re-assemble broken segments etc. This step is a unique feature of the method. In the second step, the audio data thus extracted and placed in standard digital sound files can be further processed for additional noise reduction, equalization, and other audio effects. This second step is what is normally done in studio "re-mastering" efforts using existing professional tools.

We claim:
1. A method of extracting an audio signal from a mechanical recording having a modulated groove on a surface, wherein said groove is formed by a modulated curvilinear longitudinal profile substantially orthogonal to a plurality of sequential transverse profiles from beginning to end of the groove, said longitudinal profile at each point in the transverse profile substantially tangent to said surface, each transverse section comprising two side surfaces and a bottom surface distanced from said surface, comprising:
   i) profiling said mechanical recording to form a metrological data set comprising metrological data, said profiling step comprising:
      confocally imaging said modulated groove; and
   ii) processing said metrological data set by obtaining transverse profiles of said longitudinal profile representative of the modulated groove in three dimensions; and
   iii) further processing said metrological data set to reconstitute said audio signal defined by variations in the modulation of said modulated groove.

2. The method of claim 1, wherein said providing mechanical recording step further comprises:
   a) said modulated groove projecting above the surface of a negative medium.

3. The method of claim 1, wherein said providing mechanical recording step further comprises:
   a) said modulated groove indenting below the surface of a positive medium.

4. The method of claim 1 wherein said confocal imaging is polychromatic confocal imaging.

5. The method of claim 1 wherein said confocal imaging is monochromatic confocal imaging.

6. The method of claim 1, wherein said surface is selected from the group consisting of acetates, glass, wax, paraffin, lacquer, shellac, varnish, vinyl, celluloids, metallic soaps, aluminum, copper, zinc, a metal, a metal alloy, and a thermoplastic.

7. The providing step of claim 1, wherein said modulated groove comprises:
   a) a short transverse profile; and
   b) a long longitudinal profile substantially orthogonal to said short transverse profile.

8. The method of claim 7 of said profiling step, wherein said profiling step short transverse profile further comprises:
   a) a path modulation of said short transverse profile orthogonal to said long longitudinal profile.

9. The profiling step of claim 8, wherein said path modulation is in said tangent plane of said surface.

10. The profiling step of claim 8, wherein said path modulation is out of said tangent plane of said surface.

11. The method of claim 8, wherein said profiling step further comprises:
    a) joining a plurality of short transverse profiles to form said metrological data set.

12. The method of claim 1, wherein said processing step further comprises:
    a) piecewise approximating said metrological data set to model said modulated groove.

13. The method of claim 12, wherein said piecewise approximating step further comprises:
    a) tracking a spatial location of said substantially constant profile portion in said groove to provide a tracked spatial location.

14. The method of claim 13, wherein said tracking step spatial location is determined by the metrological data representing one side of said groove.

15. The method of claim 13, wherein said tracking step spatial location is determined by the metrological data representing both sides of said groove.

16. The method of claim 13, wherein said tracking step spatial location is determined by the metrological data representing said bottom surface of said groove.

17. The method of claim 13, wherein said tracking step spatial location is determined by the metrological data representing the substantially constant profile portion of said groove.

18. The method of claim 13, wherein said processing step further comprises:
   transforming said tracked spatial location into said audio extraction.

19. An audio reconstruction comprising:
   a) said audio extraction of claim 1 stored on a computer readable medium or an audio medium.

20. The method of claim 13, wherein said tracking step further comprises:
   a) interpolating said spatial location in said transverse profile portion to provide said tracked spatial location.

21. The method of claim 20 further comprising:
   a) curve fitting said tracked spatial location for minimized error from said short transverse profile portion; and
   b) transforming said tracked spatial location into said audio extraction.

22. An audio reconstruction comprising:
   a) said audio extraction of claim 21 stored on a computer readable medium or an audio medium.

23. The method of claim 13, wherein said tracking step further comprises:
   a) interpolating said spatial location in said longitudinal profile portion to provide said tracked spatial location.

24. The method of claim 23 further comprising:
   a) curve fitting said tracked spatial location for minimized error from said short transverse profile portion; and
   b) transforming said tracked spatial location into said audio extraction.

25. An audio reconstruction comprising:
   a) said audio extraction of claim 24 stored on a computer readable medium or an audio medium.

26. A method for reconstructing a mechanical recording, comprising:
   a) providing a mechanical recording comprising analog audio data;
   b) a means for extracting metrological data from said analog audio data, wherein said extracting comprises:
      i) imaging said modulated groove with digital image sectioning; and
   c) transforming said metrological data into an audio extraction of said mechanical recording.

27. A method of extracting an audio signal from a mechanical recording having a modulated groove on a surface, wherein said groove is formed by a modulated curvilinear longitudinal profile substantially orthogonal to a plurality of sequential transverse profiles from beginning to end of the groove, said longitudinal profile at each point in the transverse profile substantially tangent to said surface, each transverse section comprising two side surfaces and a bottom surface distanced from said surface, comprising:
   i) profiling said mechanical recording to form a metrological data set comprising metrological data, said profiling step comprising:
      imaging said modulated groove with digital image sectioning; and
   ii) processing said metrological data set by obtaining transverse profiles of said longitudinal profile representative of the modulated groove in three dimensions; and
   iii) further processing said metrological data set to reconstitute said audio signal defined by variations in the modulation of said modulated groove.

* * * * *